US012471060B2

(12) United States Patent
Hassan et al.

(10) Patent No.: US 12,471,060 B2
(45) Date of Patent: Nov. 11, 2025

(54) USER EQUIPMENT AND METHOD WITH IMPROVED CRITICAL COMMUNICATION NOTIFICATION IN WIRELESS COMMUNICATIONS

(71) Applicant: KONINKLIJKE PHILIPS N.V., Eindhoven (NL)

(72) Inventors: Khaled Shawky Hassan, Erlangen (DE); Elke Roth-Mandutz, Erlangen (DE); Benjamin Sackenreuter, Erlangen (DE)

(73) Assignee: Koninklijke Philips N.V., Eindhoven (NL)

( * ) Notice: Subject to any disclaimer, the term of this patent is extended or adjusted under 35 U.S.C. 154(b) by 921 days.

(21) Appl. No.: 17/163,853

(22) Filed: Feb. 1, 2021

(65) Prior Publication Data

US 2021/0160822 A1 May 27, 2021

Related U.S. Application Data

(63) Continuation of application No. PCT/EP2019/071380, filed on Aug. 8, 2019.

(30) Foreign Application Priority Data

Aug. 10, 2018 (EP) .................................... 18188596

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 4/90* (2018.02); *H04W 68/005* (2013.01);
(Continued)

(58) Field of Classification Search
CPC ......... H04W 72/02; H04W 4/40; H04W 4/90; H04W 68/005; H04W 72/0446;
(Continued)

(56) References Cited

U.S. PATENT DOCUMENTS 7,949,307 B2  5/2011  Ode
8,009,617 B2  8/2011  Sarkar et al.
(Continued)

FOREIGN PATENT DOCUMENTS

EP  3337272 A1 *  6/2018  .............. H04W 4/04
EP  3352512 A1     7/2018
(Continued)

OTHER PUBLICATIONS

NGMN Alliance A White Paper "Small Cell Backhaul Requirements", Version 1.0, Jun. 4, 2012, 2012.
(Continued)

*Primary Examiner* — Ayaz R Sheikh

(57) ABSTRACT

A user equipment for wireless communications is provided. The user equipment includes a transmitter and a receiver. A first resource pool includes a first plurality of resources for transmission. A second resource pool includes a second plurality of resources for transmission. The second resource pool configuration is different from the first resource pool configuration or is equal to the first resource pool configuration. The transmitter is configured to transmit a first critical communication notification being a first message in the first resource pool, wherein the first critical communication notification indicates that a second message is to be transmitted in the second resource pool. Moreover, the transmitter is configured to transmit the second message in the second resource pool after transmitting the first critical communication notification or at a same time when transmitting the first critical communication notification. More-
(Continued)

over, a third resource pool and a fourth resource pool is provided.

28 Claims, 14 Drawing Sheets

(51) Int. Cl.
    *H04W 4/90* (2018.01)
    *H04W 68/00* (2009.01)
    *H04W 72/0446* (2023.01)
    *H04W 72/0453* (2023.01)

(52) U.S. Cl.
    CPC ... *H04W 72/0446* (2013.01); *H04W 72/0453* (2013.01)

(58) Field of Classification Search
    CPC . H04W 72/0453; H04W 72/51; H04W 72/53; H04W 72/56; H04W 92/18
    See application file for complete search history.

(56) References Cited

U.S. PATENT DOCUMENTS

| | | | |
|---|---|---|---|
| 11,013,015 | B2 | 5/2021 | Loehr et al. |
| 2016/0183276 | A1 | 6/2016 | Marinier et al. |
| 2017/0142727 | A1* | 5/2017 | Ode ................. H04W 72/0453 |
| 2017/0230939 | A1 | 8/2017 | Rudolf et al. |
| 2018/0234994 | A1* | 8/2018 | Yasukawa ............... H04W 4/70 |
| 2019/0253990 | A1* | 8/2019 | Lee .................... H04W 56/001 |
| 2022/0039080 | A1* | 2/2022 | Khoryaev ............. H04W 4/025 |

FOREIGN PATENT DOCUMENTS

| | | | | |
|---|---|---|---|---|
| EP | 3503635 | A1 | 6/2019 | |
| JP | 2016527845 | A | 9/2016 | |
| JP | 2017529759 | A | 10/2017 | |
| WO | 2017026463 | A1 | 2/2017 | |
| WO | 2017026517 | A1 | 2/2017 | |
| WO | WO-2017017871 | A1 * | 2/2017 | |
| WO | WO-2017030338 | A1 * | 2/2017 | ............ H04W 28/02 |

OTHER PUBLICATIONS

3GPP TS 36.211 Evolved Universal Terrestrial Radio Access (E-UTRA); Physical Channels and Modulation, V14.3.0, 2017.
3GPP TS 36.212 Evolved Universal Terrestrial Radio Access (E-UTRA); Multiplexing and channel coding, V14.3.0, 2017.
3GPP TS 36.213 Evolved Universal Terrestrial Radio Access (E-UTRA); Physical layer procedures; V14.5.0, 2017.
3GPP TS 36.321 Evolved Universal Terrestrial Radio Access (E-UTRA); Medium Access Control (MAC) protocol specification, V14.3.0, 2017.
3GPP TS 36.331 Evolved Universal Terrestrial Radio Access (E-UTRA)—Radio Resource Control (RRC); V14.7.0, 2018.
"About DL pre-emption indication", ZTE, Sanechips, 3GPP TSG-RAN WG1 NR_AH_1709 R1-1715561, [online], Sep. 12, 2017, [retrieved on Jun. 27, 2022], <URL: https://www.3gpp.org/ftp/tsg_ran/WG1_RL1/TSGR1_AH/NR_AH_1709/Docs/R1-1715561.zip>, Sep. 2017, 9 pp.
"Discussion on pre-emption indication for downlink", LG Electronics, 3GPP TSG-RAN WG1 Meeting #90 R1-1713198, [online], Aug. 12, 2017, [retrieved on Jun. 27, 2022], <URL: https://www.3gpp.org/ftp/tsg_ran/WG1_RL1/TSGR1_90/Docs/R1-1713198.zip>, Aug. 2017, 5 pp.

* cited by examiner

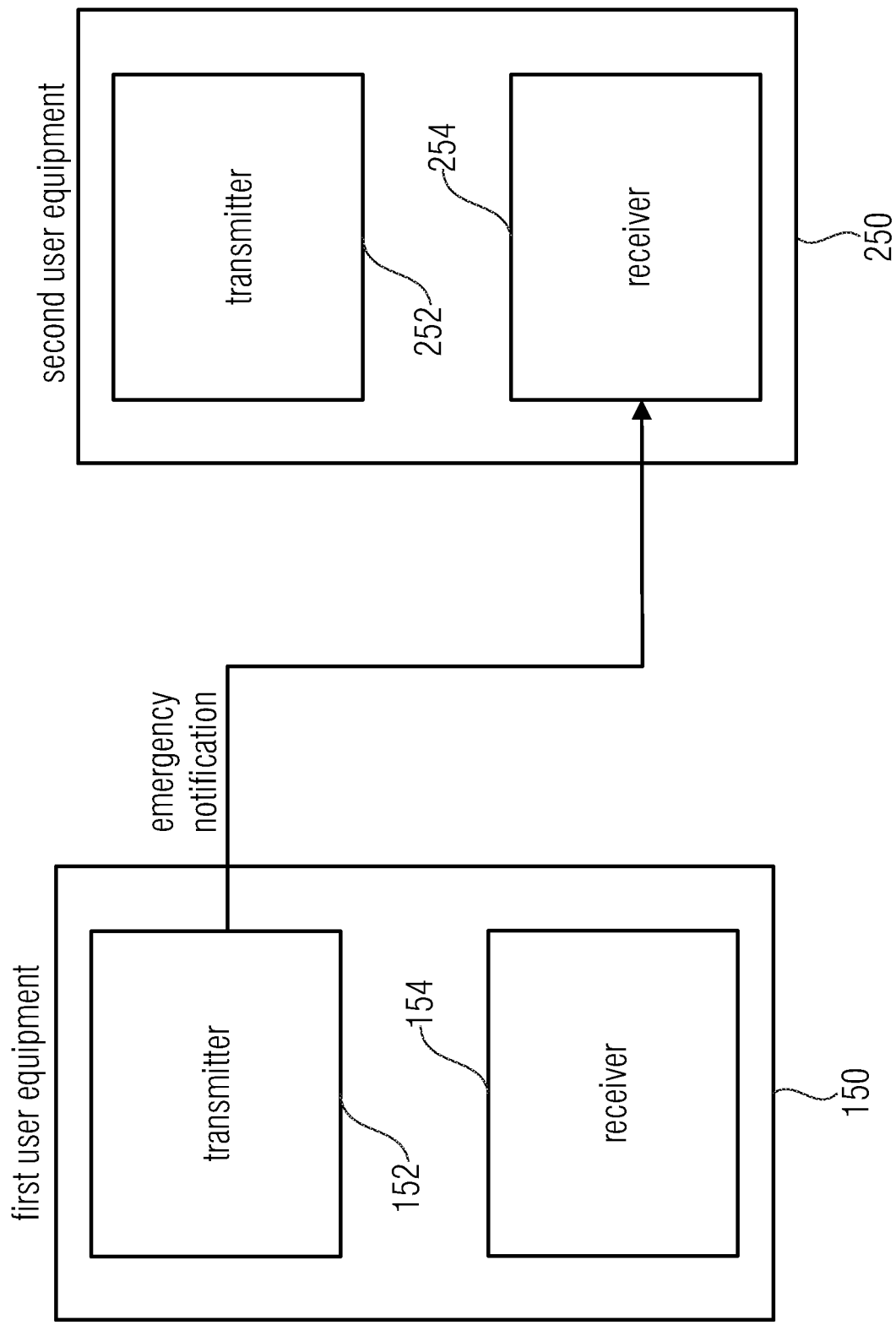

USER EQUIPMENT AND METHOD WITH IMPROVED CRITICAL COMMUNICATION NOTIFICATION IN WIRELESS COMMUNICATIONS

CROSS-REFERENCES TO RELATED APPLICATIONS

This application is a continuation of copending International Application No. PCT/EP2019/071380, filed Aug. 8, 2019, which is incorporated herein by reference in its entirety, and additionally claims priority from European Application No. EP 18 188 596.3, filed Aug. 10, 2018, which is incorporated herein by reference in its entirety.

The present invention relates to the field of wireless communication networks, and more specifically, to concepts for transmitting data in wireless communication networks. In particular, the present invention relates to a user equipment and a method with improved critical communication in wireless communications. A critical communication may, for example, be an emergency notification, for example, in V2X (vehicle-to-everything) or D2D (device-to-device) or may, for example, relate to other types of communication which involve very low latency and/or high reliability.

BACKGROUND OF THE INVENTION

In mobile communications, different entities may communicate with each other. For example, some of the possible communications between different entities may be classified into V2X, for example V2V (vehicle-to-vehicle), and D2D communications. In V2X, data signaling and control signaling is always multiplexed in either frequency or time. Data and control maybe transmitted in the same subframe or in different/subsequent sub-frames.

Typically, communication takes place using an uplink, e.g., from a user equipment (UE=user equipment/user entity) to an base station, or using a downlink, e.g., from the base station to the user equipment. A base station may, e.g., be any kind of NodeB, e.g., an eNB (evolved Node B). A sidelink transmission, e.g., a transmission between two user equipments, without a link to the base station, is a relatively new concept that becomes increasingly important.

Detailed information on V2X, V2V, D2D (device-to-device), and sidelinks may, e.g., be found in [1], [3], [4]. Information on grant-free transmission, i.e., pre-configured resources, in the sidelinks (transmission mode 2 and 4, D2D) may, e.g., be found in [2] and [5]. According to [1], the UE shall randomly select the cyclic shift $n_{CS,\lambda}$ among $\{0, 3, 6, 9\}$ in each Physical Sidelink Control Channel (PSCCH) transmission.

The current V2X specification of 3GPP (3rd Generation Partnership Project) in the long-term evolution (LTE) supports two modes, namely mode 3 and mode 4. In the new radio (NR) 5' generation (5G), those modes are mainly a centralized resource allocation (mode-3-like) and autonomous resource allocation (mode-4-like).

In mode 3, resource provisioning is conducted via a base station. A user equipment (UE) is connected to a base station which supports V2X operation and obtains its resources from the base station.

Mode 4 is an autonomous mode employing distributed scheduling. A UE may be used to detect suitable resources by itself. Currently, in mode 4, a one-second sensing operation is needed prior to using any resources for transmission.

A concept of emergency pool comprises there exists a special resource pool, a special resource configuration, special resource pool configuration, a special (common) bandwidth part (BWP) that can be used for very limited purposes, for example, during handover/radio-link-failure (RLF) by UEs that have no dedicated grants resource-grants for transmission. These configured/pre-configured resources are referred to in this context as a shared resource pool or shared/common configured grants or a common bandwidth part (BWP), i.e., which can also be the legacy exceptional pool for V2X, a normal shared pool or configured grants in a full bandwidth, sub bandwidth, or a bandwidth part (BWP), In V2X, a shared resource pool, a common configured resources, or a common BWP for Sidelink (SL) communication is mainly defined to carry communication in exceptional situations, whenever resources cannot be configured/pre-configured (e.g., during radio-link failure, during switching the user-equipment from connected to idle, when sensing results are not available or during handover). This is valid for both scheduling modes, the network-controlled grant-based resource selection in mode 3 and autonomous resources selection mode 4. In LTE (Long Term Evolution) Release 15, access to the exceptional resource pool (a shared resource pool or shared/common configured grants or a common bandwidth part (BWP)) is only possible with random selection of the resources.

Hence, the main objective of this exceptional pool (a shared resource pool or shared/common configured grants or a common bandwidth part (BWP)) is to be accessed only shortly and instantaneously during exceptional situation to avoid any congestion on the exceptional pool. Transmission of large PDCP (Packet Data Convergence Protocol) PDUs (Protocol Data Unit) over sidelink in the exceptional pool is not supported to allow opening resources for other UEs and avoid higher probability for collision.

E.g., the exceptional pool is a resource pool comprising a plurality of resources for transmission, being a shared resource pool or shared/common configured grants or a common bandwidth part (BWP), also a legacy exceptional pool.

In [6], an critical missions and emergency notifications (e.g., can be for Ultra-Reliable Low-Latency Communication, URLLC, packets with high quality-of-service (QoS) flow and requirements) requesting spontaneous grant free transmission for V2X is described.

To ensure successful emergency notifications (emergency notification=EN) for V2X, low latency and high reliability are mandatory.

Therefore, it would be highly appreciated, if improved concepts for emergency notifications would be provided.

SUMMARY

According to an embodiment, a user equipment for wireless communications may have: a transmitter and a receiver, wherein a first resource pool, being defined by a first resource pool configuration, includes a first plurality of resources for transmission, and wherein a second resource pool, being defined by a second resource pool configuration, includes a second plurality of resources for transmission, wherein the second resource pool configuration is different from the first resource pool configuration or is equal to the first resource pool configuration, wherein the transmitter of the user equipment is configured to transmit a first critical communication notification being a first message in the first resource pool, wherein the first critical communication notification indicates that a second message is to be transmitted in the second resource pool, wherein the transmitter of the user equipment is configured to transmit the second message in the second resource pool after transmitting the first critical communication notification or at a same time when transmitting the first critical communication notification, wherein a third resource pool, being defined by a third resource pool configuration, includes a third plurality of resources for transmission, and wherein a fourth resource pool, being defined by a fourth resource pool configuration, includes a fourth plurality of resources for transmission, wherein the fourth resource pool configuration is different from the third resource pool configuration or is equal to the third resource pool configuration, wherein the receiver of the user equipment is configured to receive a second critical communication notification being a third message, the second critical communication notification being transmitted in the third resource pool, wherein the second critical communication notification indicates that a fourth message is to be transmitted in the fourth resource pool, and wherein the transmitter of the user equipment is configured to not transmit anything in the fourth resource pool in response to the receipt of the second critical communication notification by the receiver.

Another embodiment may have a system for wireless communications, wherein the system includes a plurality of user equipments, wherein each of the plurality of user equipments is an inventive user equipment, wherein the plurality of user equipments includes a first user equipment and a second user equipment, wherein a first resource pool includes a first plurality of resources for transmission, and wherein a second resource pool includes a second plurality of resources for transmission, wherein the second resource pool configuration is different from the first resource pool configuration or is equal to the first resource pool configuration, wherein the transmitter of the first user equipment is configured to transmit an critical communication notification being a first message in the first resource pool, wherein the critical communication notification indicates that a second message is to be transmitted in the second resource pool, wherein the receiver of the second user equipment is configured to receive the critical communication notification from the transmitter of the first user equipment, wherein the transmitter of the second user equipment is configured to not transmit anything in the second resource pool in response to the receipt of the critical communication notification by the receiver of the second user equipment, wherein the transmitter of the first user equipment is configured to transmit the second message in the second resource pool after transmitting the critical communication notification or at a same time when transmitting the critical communication notification.

Another embodiment may have a method for wireless communications, wherein a first resource pool, being defined by a first resource pool configuration, includes a first plurality of resources for transmission, and wherein a second resource pool, being defined by a second resource pool configuration, includes a second plurality of resources for transmission, wherein the second resource pool configuration is different from the first resource pool configuration or is equal to the first resource pool configuration, wherein a third resource pool, being defined by a third resource pool configuration, includes a third plurality of resources for transmission, and wherein a fourth resource pool, being defined by a fourth resource pool configuration, includes a fourth plurality of resources for transmission, wherein the fourth resource pool configuration is different from the third resource pool configuration or is equal to the third resource pool configuration, the method having the steps of: transmitting a first critical communication notification being a first message by a transmitter of a user equipment in the first resource pool, wherein the first critical communication notification indicates that a second message is to be transmitted in the second resource pool, transmitting the second message by the transmitter in the second resource pool after transmitting the first critical communication notification or at a same time when transmitting the first critical communication notification, receiving a second critical communication notification being a third message, the second critical communication notification being transmitted in the third resource pool by a receiver of the user equipment, wherein the second critical communication notification indicates that a fourth message is to be transmitted in the fourth resource pool, and not transmitting anything in the fourth resource pool by the transmitter in response to the receipt of the second critical communication notification by the receiver.

Another embodiment may have a non-transitory digital storage medium having a computer program stored thereon to perform the method for wireless communications, wherein a first resource pool, being defined by a first resource pool configuration, includes a first plurality of resources for transmission, and wherein a second resource pool, being defined by a second resource pool configuration, includes a second plurality of resources for transmission, wherein the second resource pool configuration is different from the first resource pool configuration or is equal to the first resource pool configuration, wherein a third resource pool, being defined by a third resource pool configuration, includes a third plurality of resources for transmission, and wherein a fourth resource pool, being defined by a fourth resource pool configuration, includes a fourth plurality of resources for transmission, wherein the fourth resource pool configuration is different from the third resource pool configuration or is equal to the third resource pool configuration, the method having the steps of: transmitting a first critical communication notification being a first message by a transmitter of a user equipment in the first resource pool, wherein the first critical communication notification indicates that a second message is to be transmitted in the second resource pool, transmitting the second message by the transmitter in the second resource pool after transmitting the first critical communication notification or at a same time when transmitting the first critical communication notification, receiving a second critical communication notification being a third message, the second critical communication notification being transmitted in the third resource pool by a receiver of the user equipment, wherein the second critical communication notification indicates that a fourth message is to be transmitted in the fourth resource pool, and not transmitting anything in the fourth resource pool by the transmitter in response to the receipt of the second critical communication notification by the receiver, when said computer program is run by a computer.

A user equipment for wireless communications is provided. The user equipment comprises a transmitter and a receiver. A first resource pool, being defined by a first resource pool configuration, comprises a first plurality of resources for transmission. A second resource pool, being defined by a second resource pool configuration, comprises a second plurality of resources for transmission. The second resource pool configuration is different from the first resource pool configuration or is equal to the first resource pool configuration. The transmitter is configured to transmit a first critical communication notification being a first message in the first resource pool, wherein the first critical communication notification indicates that a second message is to be transmitted in the second resource pool. Moreover, the transmitter is configured to transmit the second message in the second resource pool after transmitting the first critical communication notification or at a same time when transmitting the first critical communication notification. A third resource pool, being defined by a third resource pool configuration, comprises a third plurality of resources for transmission. A fourth resource pool, being defined by a fourth resource pool configuration, comprises a fourth plurality of resources for transmission. The fourth resource pool configuration is different from the third resource pool configuration or is equal to the third resource pool configuration. The receiver is configured to receive a second critical communication notification being a third message, the second critical communication notification being transmitted in the third resource pool, wherein the second critical communication notification indicates that a fourth message is to be transmitted in the fourth resource pool. The transmitter is configured to not transmit anything in the fourth resource pool in response to the receipt of the second critical communication notification by the receiver.

Moreover, a method for wireless communications is provided. A first resource pool comprises a first plurality of resources for transmission. A second resource pool comprises a second plurality of resources for transmission. The second resource pool configuration is different from the first resource pool configuration or is equal to the first resource pool configuration. A third resource pool comprises a third plurality of resources for transmission. A fourth resource pool comprises a fourth plurality of resources for transmission. The fourth resource pool configuration is different from the third resource pool configuration or is equal to the third resource pool configuration. The method comprises:

Transmitting a first critical communication notification being a first message by a transmitter of a user equipment in the first resource pool, wherein the first critical communication notification indicates that a second message is to be transmitted in the second resource pool, Transmitting the second message by the transmitter in the second resource pool after transmitting the first critical communication notification or at a same time when transmitting the first critical communication notification, Receiving a second critical communication notification being a third message, the second critical communication notification being transmitted in the third resource pool by a receiver of the user equipment, wherein the second critical communication notification indicates that a fourth message is to be transmitted in the fourth resource pool. And:

Not transmitting anything in the fourth resource pool by the transmitter in response to the receipt of the second critical communication notification by the receiver.

Moreover, a computer program for implementing the above-described method when being executed on a computer or signal processor is provided.

Embodiments are based on new concepts for a very low latency and high reliable access, which is suitable for direct D2D communication. The new concepts may, e.g., also partly apply for critical communication notifications in the uplink.

The new concepts may, e.g., comprise transmission of a spontaneous, grant free EN using specific signal characteristics, e.g., increased power settings. A unique signal indicating an emergency may, e.g., be transmitted. The critical communication notification may, e.g., be transmitted in a frequency/time domain, not used in the currently defined frame structure. Retransmission may, e.g., be defined to ensure the requested reliability or QoS (Quality of Service). On reception of the EN, the UEs in the proximity may, e.g., be configured to stop transmission in a consecutive D2D pool to avoid interference with retransmitted ENs. UEs not receiving the EN due to simultaneous transmission, while the EN was sent, are informed, e.g., using a randomized time-frequency resource to avoid repeated interference in subsequent TTIs (TTI=Transmission Time Interval) or also known as a sub-frame (SF). Relaying the critical communication notification may, e.g., be employed to inform further remote UEs.

According to embodiments, instantaneous resource pool access is provided to announce an emergency transmission or high priority data transmission in parallel or in a deferred timeslot. For example, if UEs support multiple component carriers, concurrent transmission of the announcement and the data transmission may, e.g., be possible.

In embodiments, the announcement on the exceptional pool may, e.g., provide an indication (for example, one or more pointers, one or more offsets) to resources used for the transmission of the payload. This information may, e.g., comprise a subframe indication and/or a frequency indication and/or a resource pool identified of the pool used for the data transmission and/or component carrier identification.

A resource pool may, e.g., be defined exceptionally for mission critical communication. This resource pool can be sent over an exceptional resource pool comprising new radio resources being assigned by pre-configured or configured grants, e.g., of new radio resources. Or, legacy LTE transmission or LTE bands may, e.g., be used to transmit one or more short control messages and/or one or more short data packets. In LTE, the LTE Uu interface may be responsible for this configuration. If the resource pool (or this exceptional resources) is/are configured by NR, then it might use the NR Uu interface. (The Uu interface is a radio interface between a base station and a user equipment.)

According to embodiments, resources may, e.g., be freed as indicated in the exceptional pool: In that case, any of the resources reserved for high priority data in the exceptional poll are no longer allowed to be used by any other UEs, even if the resources were already scheduled/sensed as free prior to reception of the indication in the exceptional pool.

In embodiments, if a base station is in charge of resource allocation (e.g., in mode 3), the User Entity (UE)/User Equipment (UE) requesting high priority data transmission may, e.g., either provide a transmission on the exceptional pool (with limited resources for either control, data or both) or, e.g., a transmission on a regular pool or, e.g., both (transmission on exceptional and regular pool).

E.g., the exceptional pool is a resource pool comprising a plurality of resources for transmission.

E.g., the regular pool is another resource pool comprising another plurality of resources for transmission.

According to embodiments, if the UE is in charge of resource allocation (e.g., in mode 4) requesting high priority data transmission, the UE may, e.g., transmit on the exceptional pool (with limited resources for either control or data or both) or may, e.g., transmit on the regular pool or on both (transmission on exceptional and regular pool).

In embodiments, the high priority/critical communication notification could, e.g., be derived from the PPPP (ProSe per packet priority), or the packet delay budget or, e.g., from the PPPR (ProSe per packet reliability), or, e.g., from the packet error rate, e.g., from any combination out of the previous metrics or different QoS-flows indications.

Embodiments ensure reliable and low latency communication for the transmission of emergency/high priority messages.

Embodiments are based on an instantaneous, very short-term notification including the indication, which resources to be kept clear from any other UEs, even if already allocated/scheduled. These kept clear resources may, e.g., be reserved for the transmission of the emergency/high priority message(s).

In embodiments, UEs receiving the notification may, e.g., be configured to interrupt their active transmission or postpone their scheduled resources, if they succeeded to decode the notification.

It is assumed that all UEs which belong to LTE/5G/NR (NR=new radio) can decode the exceptional pool/exceptional pre-configured resources and the repetition on regular pools.

According to embodiments, latency is reduced and reliability is increased for high priority notifications.

Regarding latency, long sensing periods are avoided by employing "critical" resource reservation.

A UE may, e.g., be allowed to access resources in a resource pool/resource pool configurations (other than the emergency/exceptional resources/pool) without one second of sensing as may be used by in the current specification.

Regarding reliability, UEs with lower priority payload may, e.g., be prohibited to transmit even an already scheduled transmission to give preference to high priority data what avoids interference and thus results in a higher reliably for the high priority data transmission.

For example, priority/critical communication can be derived using one of the following indicators or using a combination of two or more of the following indicators:

PPPP (ProSe per packet priority)
PPPR (ProSe per packet reliability)
packet delay budget
packet error rate
QoS-flows
any combination out of the previous metrics.

Some embodiments may, e.g., realize multiplexing data and control on the exceptional pool (or any emergency/exceptional pool(s)) indicating future transmission resources period, frequency and time.

Some embodiments may, e.g., realize multiplexing data and control in the exceptional pool and redundancy in the autonomous mode.

Some embodiments may, e.g., notify on a very short term basis other UEs sharing resources on resource pools to keep the resources (in the notification) clear. An advantage may, e.g., be that any high priority/emergency message can be transmitted grant-free (e.g., with very low latency) with high reliability, as other UEs may, e.g., be prevented from using the indicated resources.

Some embodiments may, e.g., enhance the usage of the exceptional/emergency pool for allowing low latency communication.

In some embodiments, if data has be transmitted via exceptional/emergency pool, sub-channel size and/or sub-channel offset and/or an SPS period ( ) SPS=semi-persistent scheduling) may, e.g., be transmitted by the SCI (sidelink control information), and/or pre-configured period may, e.g., be transmitted by the SCI (sidelink control information).

Some embodiments may, e.g., transmit without sensing by transmission on the exceptional pool and (e.g., concurrently) by a parallel transmission on a regular pool with variable power until a certain time, (e.g., until certain time T_max_P).

Embodiments may, e.g., be employed in the fields of V2X, D2D, mMTC (massive machine type communications), URLLC and in delay critical/reliability critical communications.

In embodiments, if a vehicle has an emergency request and if the vehicle is in coverage of a base station, a subframe bitmap received by said vehicle from the base station is transmitted (forwarded) from said vehicle to another vehicle that is out of coverage of the base station.

BRIEF DESCRIPTION OF THE DRAWINGS

Embodiments of the present invention will be detailed subsequently referring to the appended drawings, in which:

FIG. 13 illustrates a system for wireless communications according to an embodiment.

DETAILED DESCRIPTION OF THE INVENTION

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Before embodiments of the invention are described in detail, concepts are described on which embodiments of the present invention are based.

Figure 2:
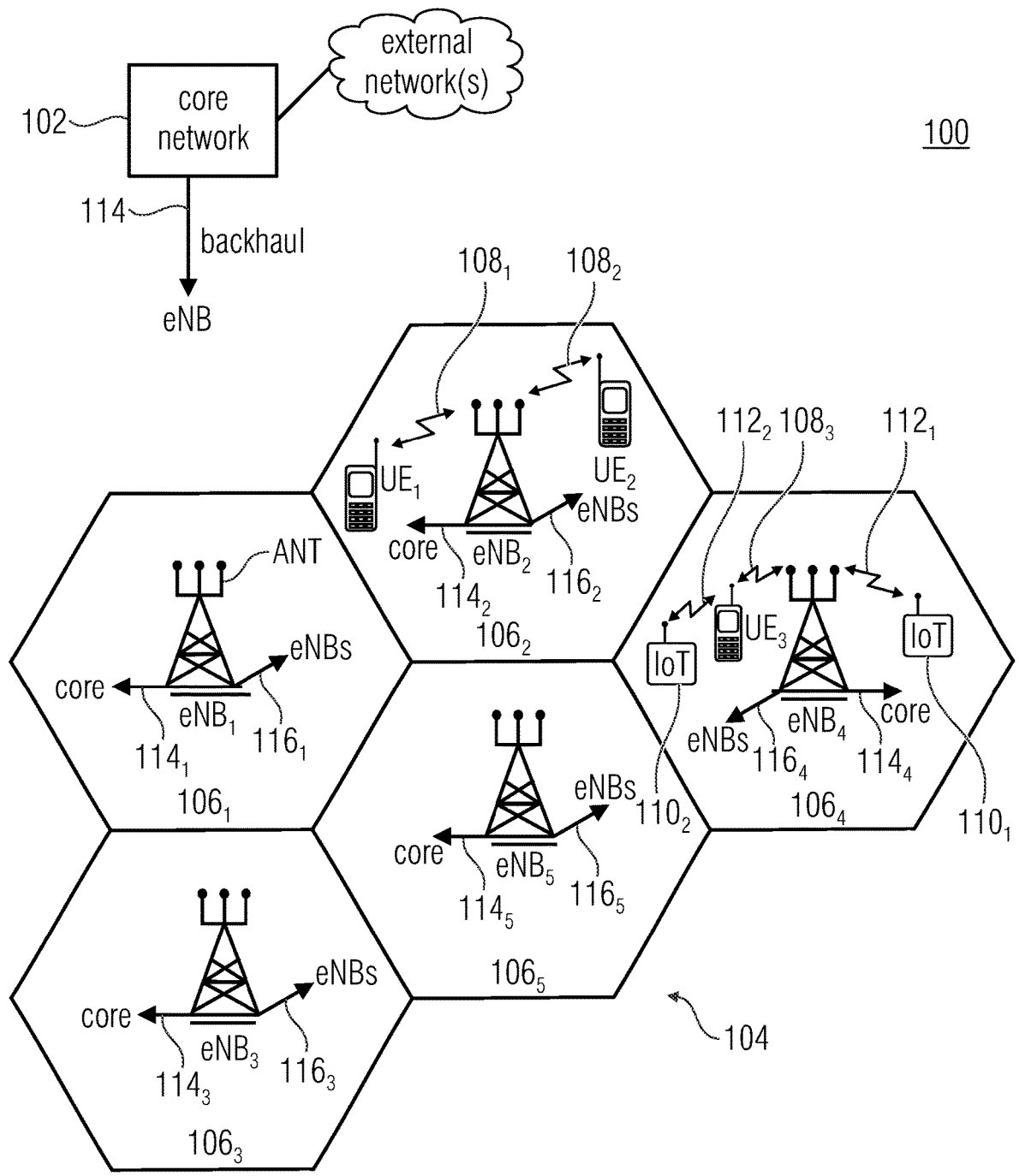
FIG. 2 illustrates a schematic representation of an example of a wireless communication system.

FIG. 2 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices (IoT=Internet of Things) which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 2 shows an exemplary view of only five cells, however, the wireless communication system may include more such cells. FIG. 2 shows two users $UE_1$ and $UE_2$, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 2 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ may be connected to the core network 102, e.g. via the S1 interface, via respective backhaul links $114_1$ to $114_5$, which are schematically represented in FIG. 2 by the arrows pointing to "core". The core network 102 may be connected to one or more external networks. Further, some or all of the respective base station $eNB_1$ to $eNB_5$ may connected, e.g. via the X1 or X2 interface, with each other via respective backhaul links $116_1$ to $116_5$, which are schematically represented in FIG. 2 by the arrows pointing to "enBs"

The wireless network or communication system depicted in FIG. 2 may by a heterogeneous network having two distinct overlaid networks, a network of macro cells with each macro cell including a macro base station, like base station $eNB_1$ to $eNB_5$, and a network of small cell base stations (not shown in FIG. 2), like femto or pico base stations.

There exist a plurality of resources for transmission. For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random-access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

For sidelink communication (either after a successful association with a base-station, e.g., for radio-resource controller (RRC) connected UEs, or for idle or remote UEs, e.g., in dedicated band, there exist a physical sidelink shared channel (PSSCH) for data. Additionally, the control on sidelink may use a physical sidelink control channel (PSCCH).

Both channels, PSSCH and PSCCH, are transmitted between UEs over the time/frequency resource grid. For sidelink transmission, the resource pool/pre-configured resources can be on dedicated carriers or together with uplink channel in band with LTE and NR.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard. In LTE, sidelink communication uses a DFT-s-OFDM waveform. In NR, the sidelink may use both wave forms, namely DFT-s-OFDM and/or OFDMA.

Figure 3:
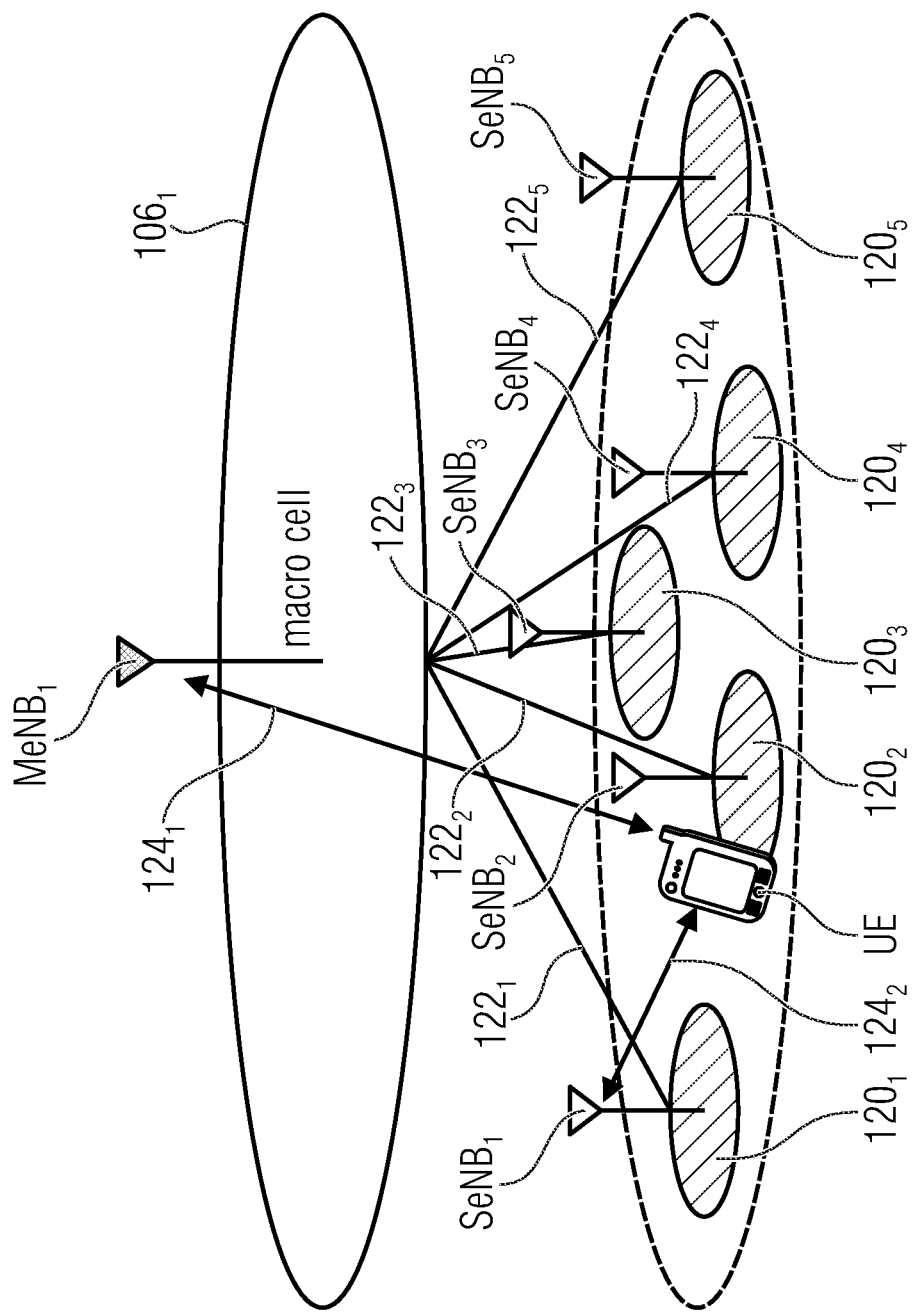
FIG. 3 illustrates a schematic representation of a cell, like a cell in FIG. 2, having two distinct overlaid networks, namely a macro cell network including a macro cell and a small cell network including small cell base stations connected via backhaul links to the macro cell base station.

In the wireless communication network as shown in FIG. 2 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 3 is a schematic representation of a cell, like cell $106_1$ in FIG. 2, having two distinct overlaid networks, the networks comprising a macro cell network including the macro cell $106_1$, and a small cell network. Although FIG. 3 represents only a single macro cell, it is noted that one or more of the other cells in FIG. 2 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 3 further shows a user equipment UE being served by the macro cell base station MeNB$_1$ as indicated by arrow 124$_1$ and by the small cell base station SeNB$_1$, as indicated schematically by the arrow 124$_2$.

Figure 4:
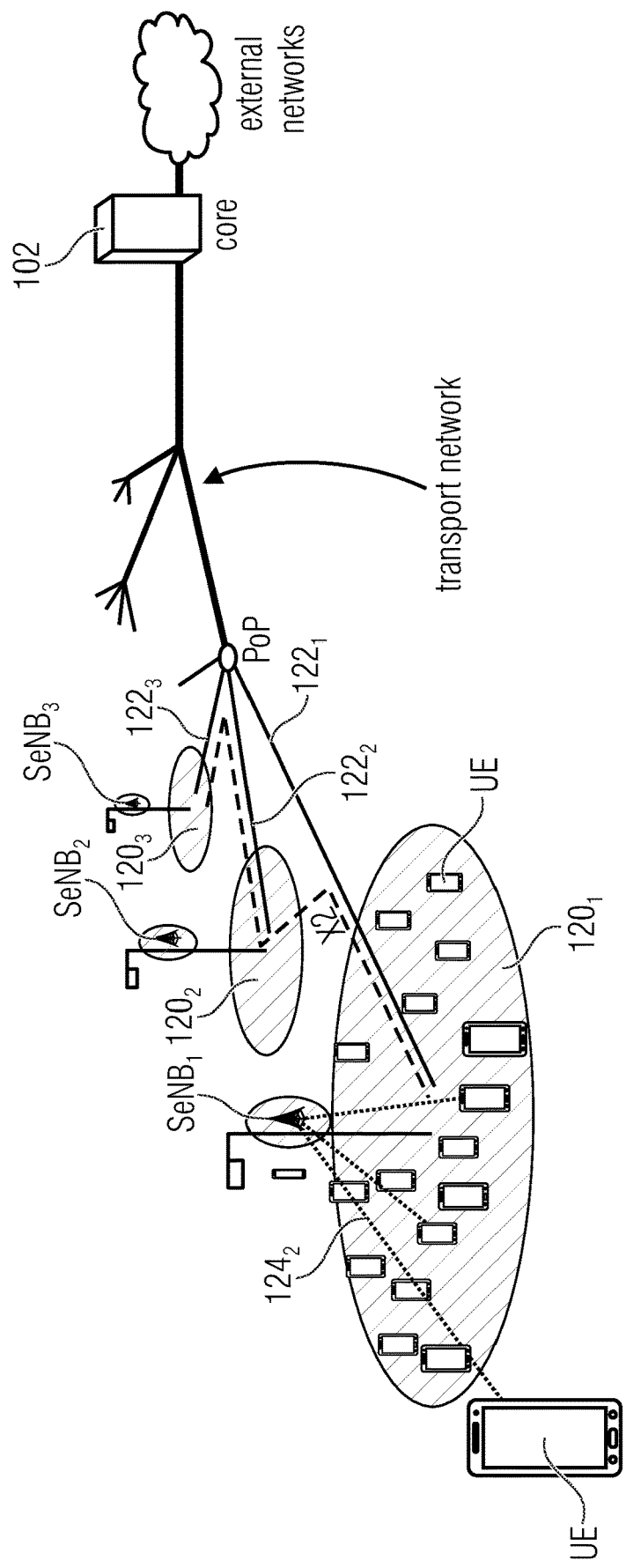
FIG. 4 illustrates a further schematic representation of a plurality of small cells of a macro cell, similar to FIG. 3, wherein the small cell base stations are connected via backhaul links to each other and to the core network.

FIG. 4 is a further schematic representation of a plurality of small cells 120$_1$ to 120$_3$ of a macro cell (not shown). The macro cell may be similar to that in FIG. 3. Each small cell may serve one or more UEs. The respective small cell base stations SeNB$_1$, SeNB$_2$, SeNB$_3$, . . . , other than in FIG. 3, are connected via the backhaul links or connections 102$_1$ to 102$_3$ to the core network 102. The respective small cells 102$_1$ to 102$_3$ may be directly connected with each other via the X2 interface, as schematically indicated in FIG. 4. The transport network connecting the respective small cells to the core network 102 may be an optical fiber network including one or more points of presence (PoP) at which a plurality of small cells are connected to the transport network. Further details about a backhaul architecture as shown in FIG. 4 is described in reference [7].

The small cells, also referred to as secondary mobile communication cells, SCs, form an overlay network to the network of macro cells, also referred to as primary mobile communication cells, PC. The small cells may be connected via backhaul links (BL) to the macro cell (FIG. 3) and/or to the core network (FIG. 4). The backhaul links may be wired or wireless links, and in case of connecting the small cells via the backhaul links to the core network, the point of presence (PoP) of the transport network (FIG. 4) may serve as an interface to the core network. Each small cell may serve a number of mobile users UE within its coverage area by means of a wireless access link (AL) 124$_2$. Further, the UEs may be connected to the primary cell, for example to receive control signals, and the connection may be referred to as a control link (CL).

In the following, embodiments of the present invention are described.

Figure 1:
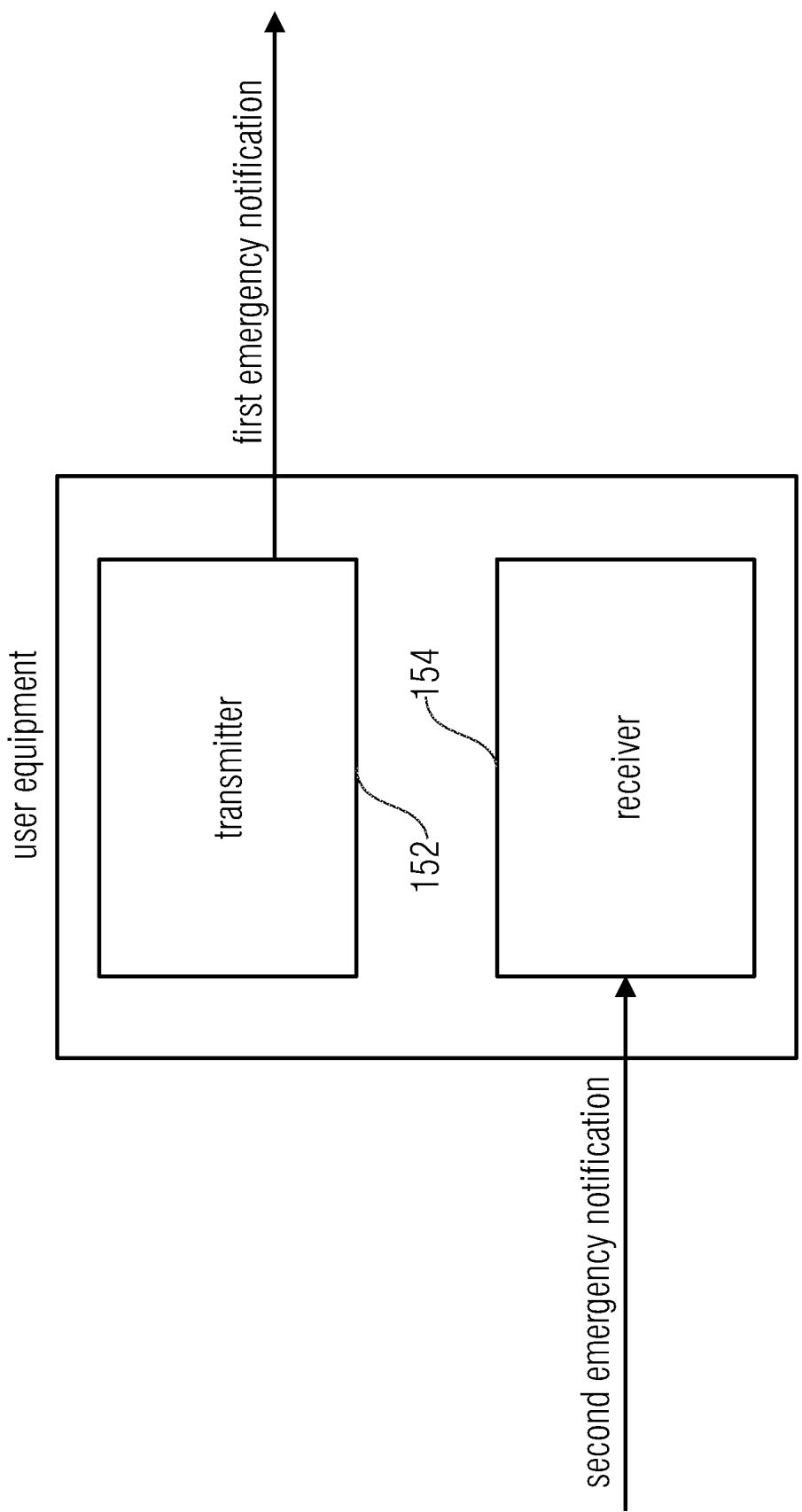
FIG. 1 illustrates a user equipment for wireless communications according to an embodiment.

FIG. 1 illustrates a user equipment for wireless communications according to an embodiment.

The user equipment comprises a transmitter 152 and a receiver 154.

The user equipment has particular capabilities:

In a first scenario, the user equipment announces a critical communication with a first message. The critical communication follows with the second message. In such a scenario:

A first resource pool, being defined by a first resource pool configuration, comprises a first plurality of resources for transmission. A second resource pool, being defined by a second resource pool configuration, comprises a second plurality of resources for transmission. The second resource pool configuration is different from the first resource pool configuration or is equal to the first resource pool configuration.

The transmitter 152 is configured to transmit a first critical communication notification being a first message in the first resource pool, wherein the first critical communication notification indicates that a second message is to be transmitted in the second resource pool.

Figure 6:
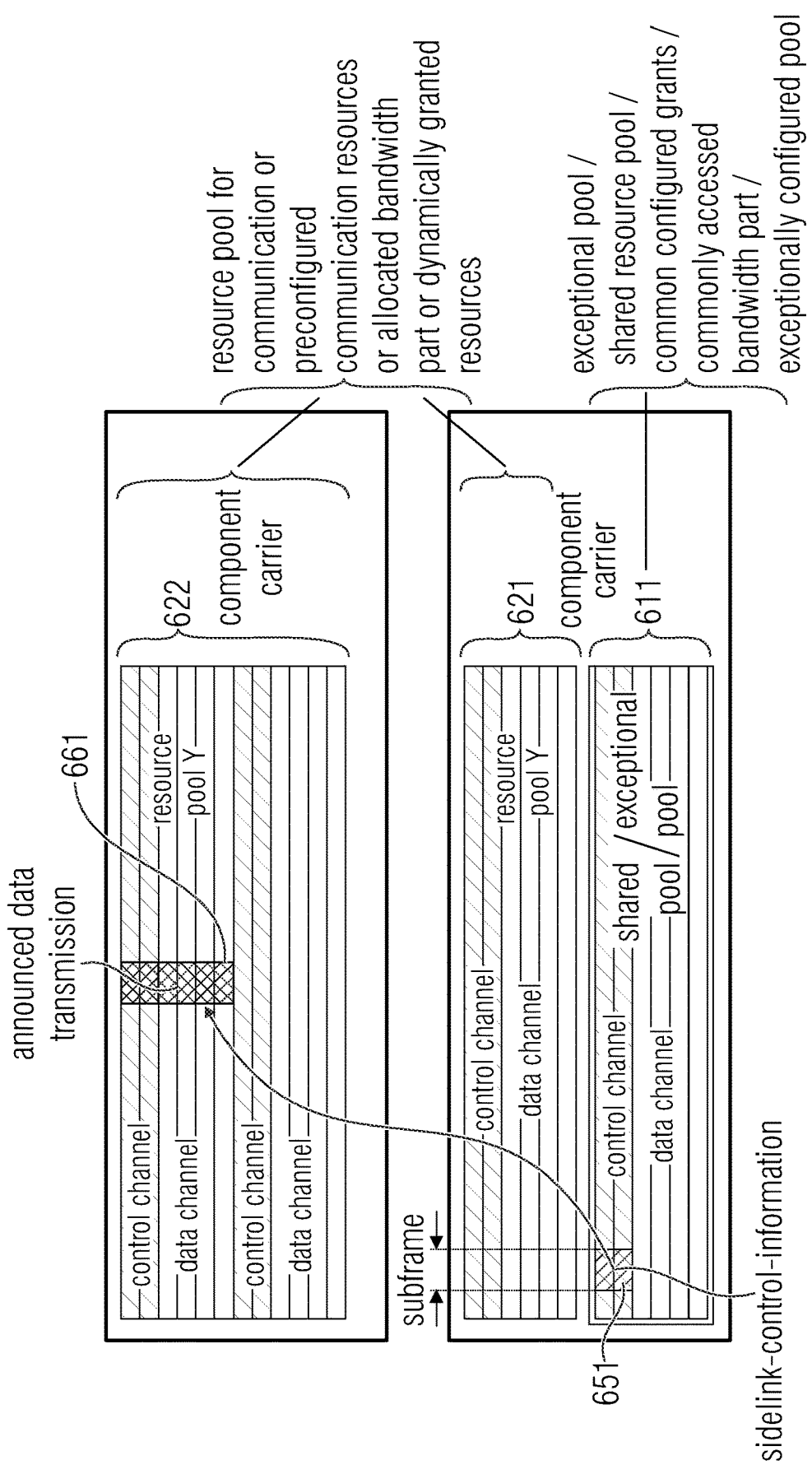
FIG. 6 illustrates a cross-carrier scheduling via an SCI transmission on an exceptional resource-pool according to an embodiment.
Figure 7:
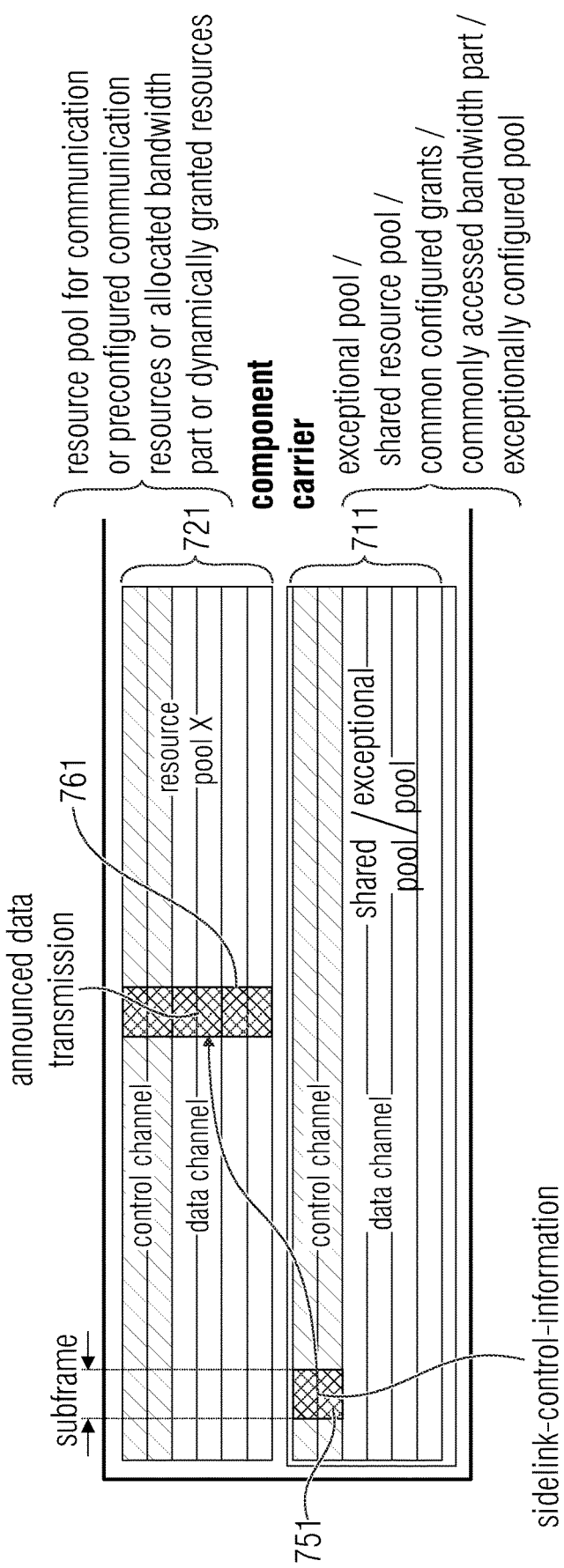
FIG. 7 illustrates an intra-carrier scheduling via an SCI transmission on an exceptional resource-pool according to an embodiment.
Figure 8:
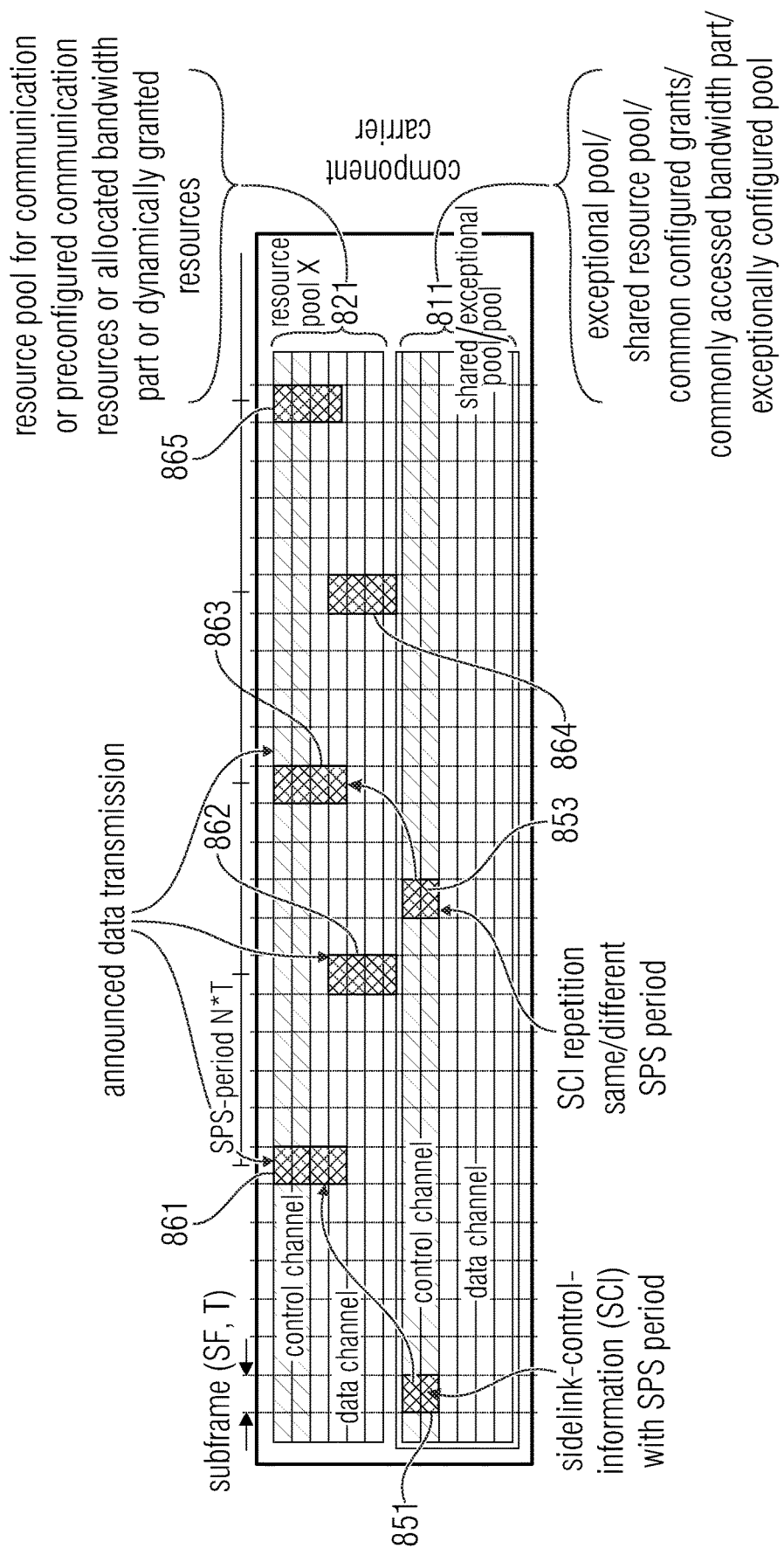
FIG. 8 illustrates an SPS repetition and SCI redundancy according to an embodiment.
Figure 9:
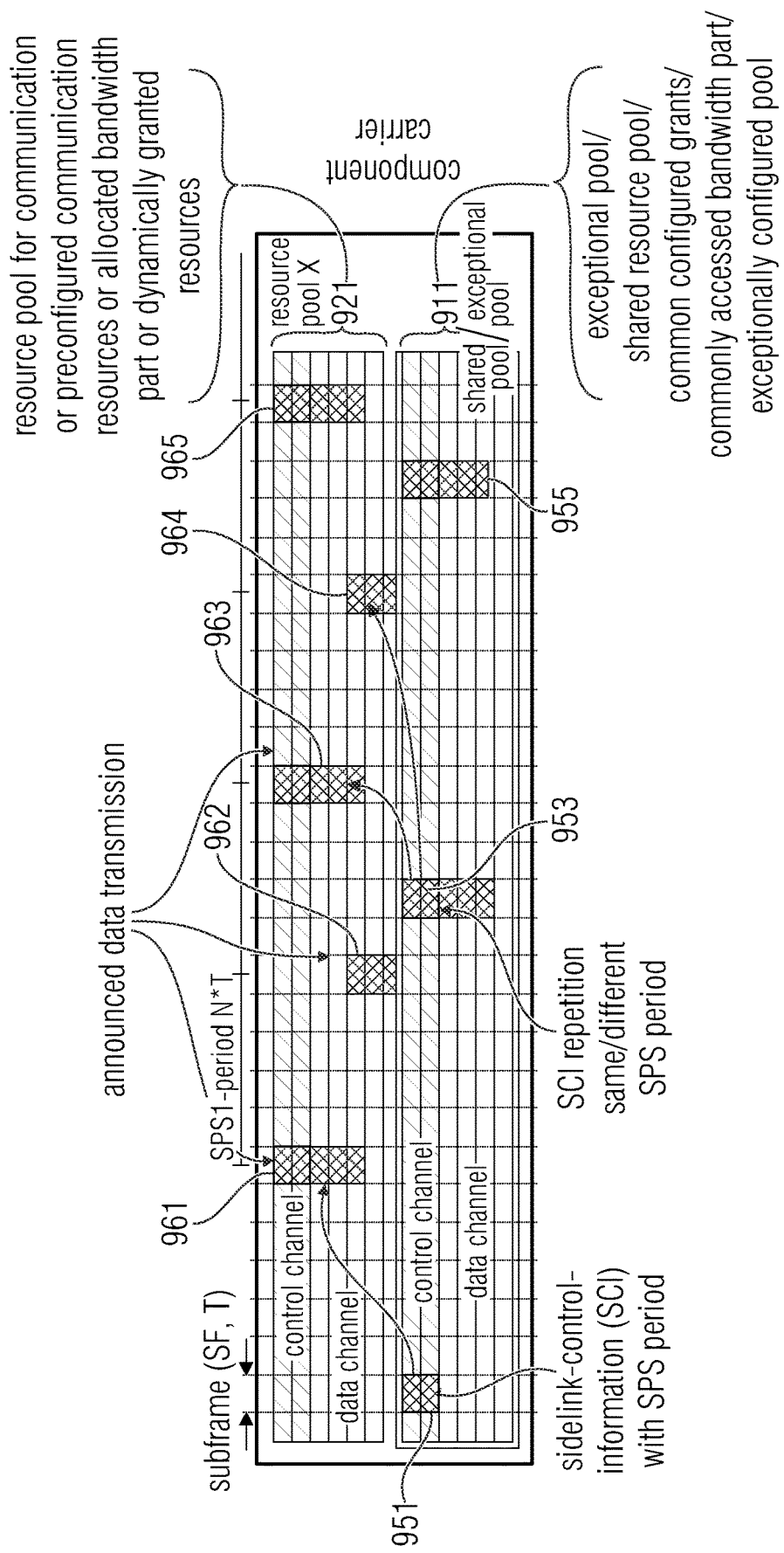
FIG. 9 illustrates SPS data underneath the control information with repetition in the exceptional pool and the regular pool according to an embodiment.
Figure 10:
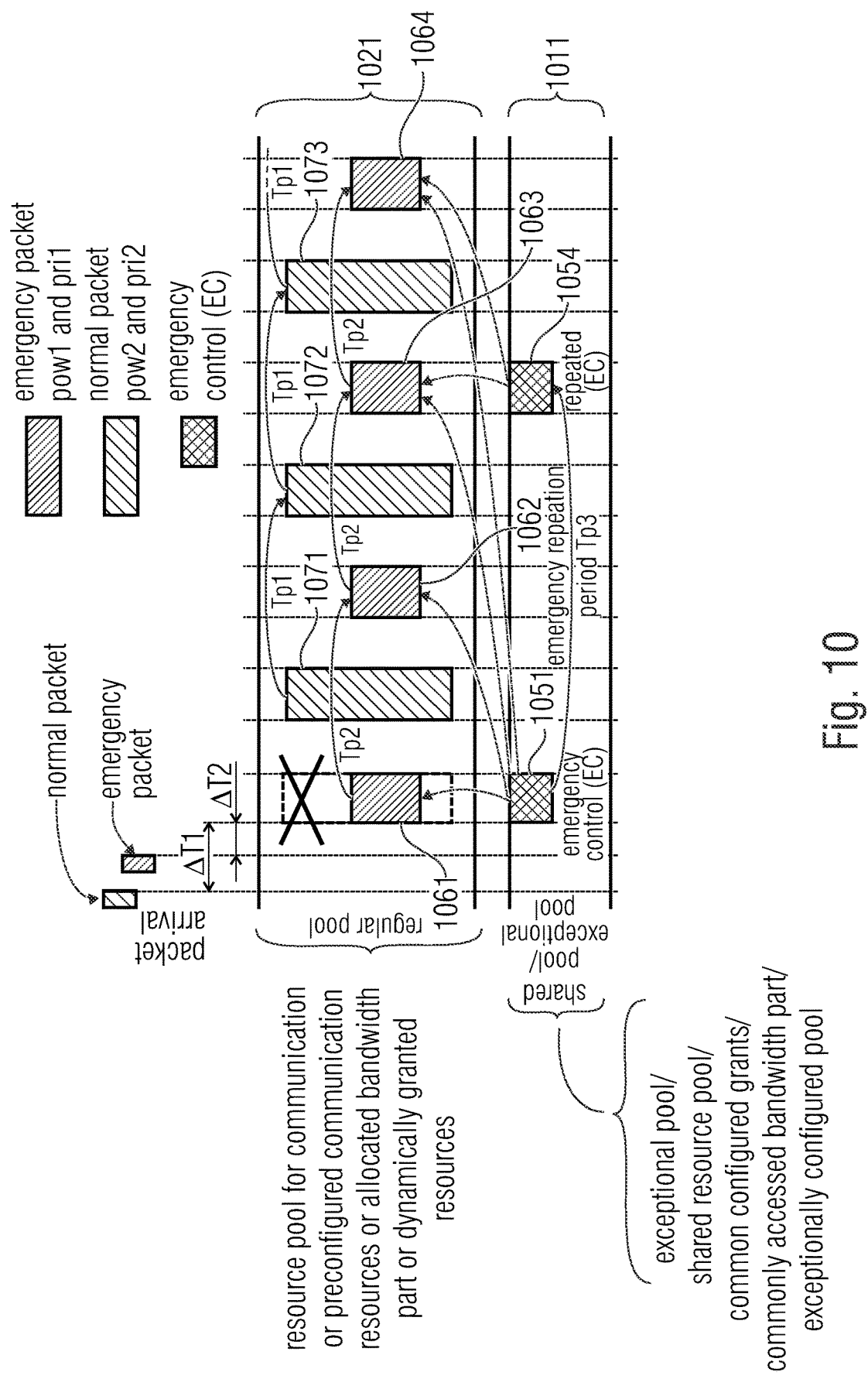
FIG. 10 illustrates a same component carrier scheduling of emergency data and regular data according to an embodiment.
Figure 11A:
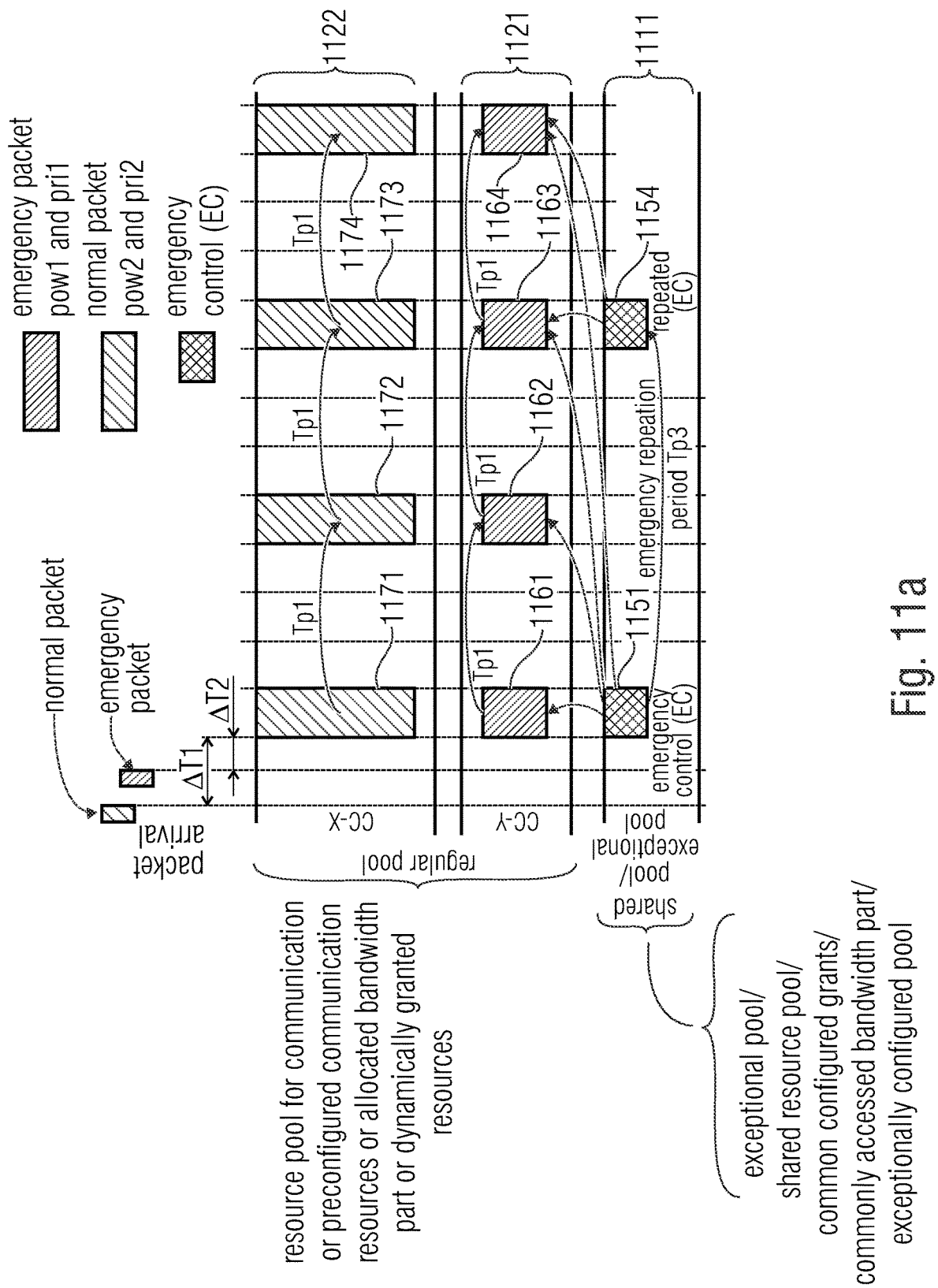
FIG. 11a illustrates a different component carrier scheduling of emergency data and regular data according to an embodiment.
Figure 11B:
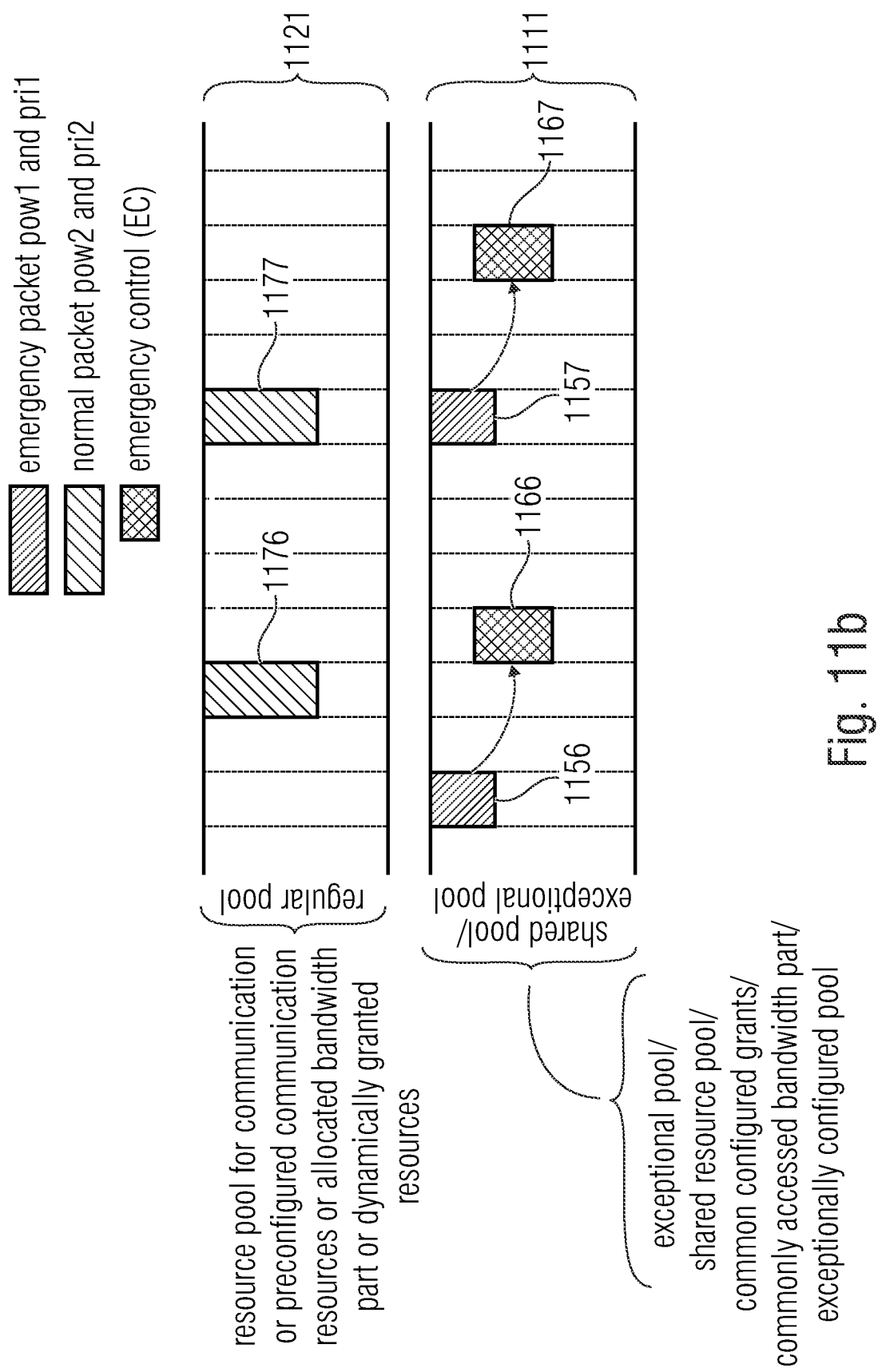
FIG. 11b illustrates a different component carrier scheduling of emergency data and regular data according to another embodiment.

Examples for a first message are messages 651 in FIG. 6, 751 in FIGS. 7, 851 and 853 in FIGS. 8, 951, 953 and 955 in FIGS. 9, 1051 and 1054 in FIGS. 10, 1151 and 1154 in FIGS. 11a and 1156 and 1157 in FIG. 11b.

Examples for a second message are messages 661 in FIG. 6, 761 in FIGS. 7, 861, 862, 863, 864 and 865 in FIGS. 8, 961, 962, 963, 964 and 965 in FIGS. 9, 1061, 1062, 1063 and 1064 in FIG. 10, 1161, 1162, 1163, 1164 in FIGS. 11 and 1166 and 1167 in FIG. 11b.

The resource pool configuration may, e.g., be resource configured grants.

The first resource pool and/or the second resource pool and/or the third resource pool and/or the fourth resource pool may, e.g., be configured in the whole band, sub-band or in a bandwidth part (BWP).

Moreover, the transmitter 152 is configured to transmit the second message in the second resource pool after transmitting the first critical communication notification or at a same time when transmitting the first critical communication notification.

In a second scenario, the user equipment receives from another communication entity an announcement of a critical communication within a third resource pool, wherein the announcement reserves a fourth resource pool for the critical communication. The user equipment adapts its behaviour and does not transmit own messages in the (reserved) fourth resource pool that is reserved by the announcement for the critical communication. The critical communication from said another communication entity itself follows. In such a scenario:

A third resource pool, being defined by a third resource pool configuration, comprises a third plurality of resources for transmission. A fourth resource pool, being defined by a fourth resource pool configuration, comprises a fourth plurality of resources for transmission. The fourth resource pool configuration is different from the third resource pool configuration or is equal to the third resource pool configuration.

The receiver 154 is configured to receive a second critical communication notification being a third message, the second critical communication notification being transmitted in the third resource pool, wherein the second critical communication notification indicates that a fourth message is to be transmitted in the fourth resource pool.

The transmitter 152 is configured to not transmit anything in the fourth resource pool in response to the receipt of the second critical communication notification by the receiver 154.

Likewise are for the first message, examples for a third message are messages 651 in FIG. 6, 751 in FIGS. 7, 851 and 853 in FIGS. 8, 951, 953 and 955 in FIGS. 9, 1051 and 1054 in FIGS. 10, 1151 and 1154 in FIGS. 11a and 1156 and 1157 in FIG. 11b.

Likewise as for the fourth message, examples for a second message are messages 661 in FIG. 6, 761 in FIGS. 7, 861, 862, 863, 864 and 865 in FIGS. 8, 961, 962, 963, 964 and 965 in FIGS. 9, 1061, 1062, 1063 and 1064 in FIG. 10, 1161, 1162, 1163, 1164 in FIGS. 11 and 1166 and 1167 in FIG. 11b.

According to an embodiment, for example, the third message comprises a pointer to a message in another resource pool defining frequency locations and a time location for one shot transmission. Or, the third message is also defining frequency locations, a time location, and repetition periodicity for repeated messages; The notification may comprises the pointer to the message, control information, and/or data transmission.

For example, according to an embodiment, the first message comprises a pointer to the second message in the second resource pool defining one or more frequency locations and a time location of the second message. Or, the first message comprises the pointer to the second message in the second resource pool defining the one or more frequency locations and the time location of the second message and a repetition periodicity.

And/or, the third message comprises a pointer to the fourth message in the fourth resource pool defining one or more frequency locations and a time location of the fourth message. Or, the third message comprises the pointer to the fourth message in the fourth resource pool defining the one or more frequency locations and the time location of the fourth message and the repetition periodicity.

According to an embodiment, the first resource pool may, e.g., be defined as a shared resource pool or common configured grants or a commonly accessed bandwidth part or an exceptionally configured pool. And/or the third resource pool may, e.g., be defined as a shared resource pool or common configured grants or a commonly accessed bandwidth part or an exceptionally configured pool.

In an embodiment, the second resource pool may, e.g., be defined as a resource pool for communication or preconfigured communication resources or allocated bandwidth part or dynamically granted resources. And/or the fourth resource pool is defined as a resource pool for communication or preconfigured communication resources or allocated bandwidth part or dynamically granted resources.

In an embodiment, the first resource pool may, e.g., comprise the first plurality of pre-configured resources for sidelink transmission, the second resource pool may, e.g., comprise the second plurality of resources for sidelink transmission, the third resource pool may, e.g., comprise the third plurality of resources for sidelink transmission, and the fourth resource pool may, e.g., comprise the fourth plurality of resources for sidelink transmission.

According to an embodiment, the transmitter 152 may, e.g., be configured to transmit a first critical communication notification in the first resource pool in a first time slot. In such an embodiment, the transmitter 152 may, e.g., be configured to transmit the second message in the second resource pool after transmitting the first critical communication notification in a second time slot, the second time slot being a deferred time slot with respect to the first time slot.

In an embodiment, the transmitter 152 may, e.g., be configured to transmit the second message in the second resource pool at at a same time slot when the first critical communication notification is transmitted or at a subsequent time slot after the first critical communication notification is transmitted.

According to an embodiment, the transmitter 152 may, e.g., be configured to transmit the first critical communication notification comprising an indication which indicates a resource for transmission of the second plurality of resources for transmission of the second resource pool. In such an embodiment, the transmitter 152 may, e.g., be configured to transmit the second message in said resource for transmission being indicated by said indication, wherein said indication comprises a pointer to said resource for transmission or comprises a subframe indication indicating a subframe or comprises a frequency indication indicating a frequency or comprises a component carrier indication indicating a component carrier.

In an embodiment, the transmitter 152 may, e.g., be configured to stop transmitting a fifth message in the fourth resource pool in response to the receipt of the second critical communication notification by the receiver 154.

According to an embodiment, a fifth message may, e.g., be scheduled for transmission in the fourth resource pool. In such an embodiment, the transmitter 152 may, e.g., be configured to not transmit the fifth message in the fourth resource pool in response to the receipt of the second critical communication notification by the receiver 154.

In an embodiment, the first resource pool may, e.g., be an exceptional pool, being a shared pool or configured grants in a full bandwidth, sub bandwidth, or a bandwidth part, for providing the first plurality of resources for transmissions having a high priority. The second resource pool may, e.g., be a regular pool for providing the second plurality of resources for transmissions having a low priority than the high priority. The transmitter 152 may, e.g., be configured to transmit the second message having the high priority in the exceptional pool, being a shared pool or configured grants in a full bandwidth, sub bandwidth, or a bandwidth part. The transmitter 152 may, e.g., be configured to transmit a sixth message having the low priority in the regular pool.

According to an embodiment, the third resource pool may, e.g., be an exceptional pool for providing the third plurality of resources for transmissions having a high priority. In such an embodiment, the fourth resource pool may, e.g., be a regular pool for providing the fourth plurality of resources for transmissions having a low priority than the high priority. Moreover, in such an embodiment, the transmitter 152 may, e.g., be configured to transmit the second message having the high priority in the exceptional pool. Moreover, in such an embodiment, transmitter 152 may, e.g., be configured to transmit a sixth message having the low priority in the regular pool.

In an embodiment, the transmitter 152 may, e.g., be configured to transmit the first critical communication notification in the first resource pool without sensing whether the first resource pool is occupied by another transmission.

According to an embodiment, after transmitting the first critical communication notification for a first time, the transmitter 152 may, e.g., be configured to retransmit the first critical communication notification in the first resource pool one or more further times.

In an embodiment, in response to the receipt of the second critical communication notification by the receiver 154, the transmitter 152 may, e.g., be configured to send the third message to one or more other user equipments (not shown in FIG. 1), wherein the third message may, e.g., indicate that the fourth message is to be transmitted in the fourth resource pool.

According to an embodiment, the transmitter 152 may, e.g., be configured to transmit the first critical communication notification with a first transmission power, wherein the transmitter 152 may, e.g., be configured to transmit the second message with a second transmission power, wherein the first transmission power may, e.g., be greater than the second transmission power.

In an embodiment, the at least one of the first critical communication notification and the second critical communication notification may, e.g., be sidelink control information comprising one or more sidelink control information data elements, wherein the sidelink control information data elements comprise at least one of a component carrier index, a subframe index, an SPS period, an offset to the transmission, a subchannel size and an indication indicating whether frequency hopping is allowed.

According to an embodiment, each of the first resource pool and the second resource pool and the third resource pool and the fourth resource pool may, e.g., be assigned to a plurality of component carriers, wherein the first resource pool may, e.g., be assigned to a first component carrier of the plurality of component carriers, and wherein the second resource pool may, e.g., be assigned to a second component carrier of the plurality of component carriers, wherein the second component carrier may, e.g., be different from the first component carrier.

In another embodiment, each of the first resource pool and the second resource pool and the third resource pool and the fourth resource pool may, e.g., be assigned to a plurality of component carriers, wherein the first resource pool may, e.g., be assigned to a first component carrier of the plurality of component carriers, and wherein the second resource pool may, e.g., be also assigned to the first component carrier.

According to an embodiment, the user equipment is configured to be installed in a vehicle, and wherein, if the user equipment of the vehicle has an emergency request and if the vehicle is in coverage of a base station, the receiver 154 of the user equipment is configured to receive a subframe bitmap from the base station and the transmitter 152 of the user equipment is configured to transmit the subframe bitmap received from said base station to another vehicle that is out of coverage of the base station.

According to an embodiment, the first resource pool is located on a same component carrier as the second resource pool, or the third resource pool is located on the same component carrier as the fourth resource pool.

In another embodiment, the first resource pool is not located on a same component carrier as the second resource pool, or the third resource pool is not located on the same component carrier as the fourth resource pool.

FIG. 13 illustrates a system for wireless communications according to an embodiment.

The system comprises a plurality of user equipments 150, 250, wherein each of the plurality of user equipments 150, 250 is a user equipment according to one of the above-described embodiments. The plurality of user equipments 150, 250 comprises a first user equipment 150 and a second user equipment 250.

A first resource pool comprises a first plurality of resources for transmission which are defined by a first resource pool configuration. A second resource pool comprises a second plurality of resources for transmission which are defined by a second pre-configuration. The second resource pool configuration is different from the first resource pool configuration or is equal to the first resource pool configuration.

The transmitter 152 of the first user equipment 150 is configured to transmit an critical communication notification being a first message in the first resource pool, wherein the critical communication notification indicates that a second message is to be transmitted in the second resource pool.

The receiver 254 of the second user equipment 250 is configured to receive the critical communication notification from the transmitter 152 of the first user equipment 150.

The transmitter 252 of the second user equipment 250 is configured to not transmit anything in the second resource pool in response to the receipt of the critical communication notification by the receiver 254 of the second user equipment 250.

The transmitter 152 of the first user equipment 150 is configured to transmit the second message in the second resource pool after transmitting the critical communication notification or at a same time when transmitting the critical communication notification.

In the following, particular embodiments of the present invention are described in detail.

At first, a control channel design and a reservation procedure for the exceptional pool announcement of data in a regular pool according to an embodiment is described.

In embodiments, control data in the exceptional pool may be employed for handling and reserving transmission or re-transmission or periodic-repetition in regular resource pools.

The provided concept is to some degree comparable to interrupt handling in computer science, with the distinction between first-level and second-level interrupt handlers.

If an emergency event occurs, the first-level part corresponds to Sidelink Control Information (SCI), that is immediately transmitted via a pre-configured exceptional pool. The SCI comprises information regarding the component carrier, the subframe and/or subchannel location of the announced data transmission, and the repetition period/pattern of the data transmission, possibly in a semi-persistent scheduling (SPS) way.

The second-level part consists of the scheduled data transmission via a normal resource pool. The scheduled data transmissions may, e.g., consist of a single transmission.

Or, the scheduled data transmissions may, e.g., comprise an initial transmission, followed by further retransmissions according to a predefined pattern. For example, an initial transmission may, e.g., be followed by periodic transmissions. The first-level transmission may, e.g., carry information regarding the transmission interval $t_{interval}$ and the length of each transmission T, where T may, e.g., be defined as T=N*ST_duration.

In the current 3GPP specification, all UEs are mandated to receive any data transmission within the exceptional pool.

According to embodiments, all UEs may, e.g., mute or skip their intended transmission in case it would collide with the second-level part (deferred/scheduled) data transmission.

In embodiments, the normal (or exceptional) pool, that is used for the data transmission opportunity after transmitting the SCI using the exceptional pool may, e.g., be selected based on the CBR (channel busy ratio).

In embodiments, the same or next possible subframe in a normal resource pool may, e.g., be selected, as it may be expected that the UEs have read the SCI from the control channel of the exceptional or from the normal resource pool. The next possible subframe may, e.g., refer to the next subframe that all UEs are able to read considering that some UEs have to retune their local oscillators to the component carrier where the deferred data transmission is scheduled.

SCI data elements may, for example comprise one or more of the following elements:

A Component carrier (CC) index; e.g., default same CC ID. If the ERP is in the same CC, then CC ID can be left unused or set to zero. Else, a different CC ID can have any value as pre-configured.

As defined in [5], Section 3.3.1.1, the IE ServCellIndex concerns a short identity, used to identify a serving cell (e.g., the PCell or a SCell). Value 0 applies for the PCell, while the ServCellIndex that has previously been assigned applies for SCells:

The ServCellIndex information element may, e.g., be defined as:
--ASN
--ASN1START
ServCellIndex-r10: : =INTEGER (0 . . . 7)
ServCellIndex-r13: : =INTEGER (0 . . . 31)
--ASN1STOP A Subframe index or offset of the initial data transmission after the emergency control announcement (second-level (payload) transmission).

An SPS period; in normal resource pool and/or exceptional/emergency pool. Where a period with interval $t_{interval}$ is defined and a maximum transmission period of $T_{max}$.

The offset to the transmission in PRBs index $n_{subCHRBstat}$ of the initial second-level (data payload and the control information) transmission (PRB=Physical Resource Block).

The subchannel size $n_{subChsize}$ as a number of PRBs, e.g., 2 control PRBs+X data PRBs.

The resource indication value (RIV) indicating the start of the resource allocation.

For SPS transmission, whether or not to apply frequency hopping with an indicated pattern. Optional, if no blind detection is possible, the pattern ID can be among the SCI information.

For pre-configured resources (grant-free transmission) for, e.g., Mode 3, may be indicated with RIV, subchannels, and transmission period/reservation.

If/Whether the second level transmission is a one-shot transmission.

Once other UEs capture the SCI information in the exceptional resource pool (ERP), they may, e.g., all tune to receive the second level data transmission(s) announced. Hence, they have to stop transmitting new data or old data in the buffer.

In the following, an exceptional pool (EP) access for data announcement according to an embodiment is described, wherein control information is sent in an exceptional pool announcing data in the same pool or in a regular pool.

If the MAC (Medium Access Control/Media Access Control) PDU is adequately large, then instead of transmitting a complete MAC PDU in the emergency pool, only a "pointer" to the resources that carry the MAC PDU is transmitted. The MAC PDU itself may, e.g., be transmitted outside the emergency pool in a parallel sidelink regular resource pool either in the same subframe (the same subframe may, e.g., relate to the same time) or on another sequential subframe (at a different time).

FIG. 6 illustrates a cross-carrier scheduling via an SCI transmission on an exceptional resource-pool according to an embodiment. In particular, FIG. 6 illustrates an exceptional pool 611, and two resource pools 621, 622. In the exceptional pool 611, a first message 651 being a critical communication notification is transmitted. A second message 661, the announced critical communication is later on transmitted in the regular pool 622. Resource pool 611 may, e.g., be defined as a shared resource pool or common configured grants or a commonly accessed bandwidth part or an exceptionally configured pool. Resource pools 621, 622 may, e.g., be defined as a resource pool for communication or preconfigured communication resources or allocated bandwidth part or dynamically granted resources.

FIG. 7 illustrates an intra-carrier scheduling via an SCI transmission on an exceptional resource-pool according to an embodiment. In particular, FIG. 7 illustrates an exceptional pool 711, and a resource pool 721. In the exceptional pool 711, a first message 751 being a critical communication notification is transmitted. A second message 761, the announced critical communication is later on transmitted in the regular pool 721. Resource pool 711 may, e.g., be defined as a shared resource pool or common configured grants or a commonly accessed bandwidth part or an exceptionally configured pool. Resource pool 721 may, e.g., be defined as a resource pool for communication or preconfigured communication resources or allocated bandwidth part or dynamically granted resources.

It should be noted that the resource pools depicted FIG. 6 and FIG. 7 are highly abstracted. For example, a resource pool does not necessarily comprise consecutive subframes or adjacent control and data channels.

In [6], if a receiving UE detects a likely collision of the received announced data transmission with its own transmission based on the SCI received via the exceptional pool, the receiving UE will skip/mute the transmission.

According to an embodiment, the SCI (or any other informational data to mute other UEs) may also be transmitted on the control channel of the "normal" resource pool or any possibly further exceptional or new resource pool. The original transmission may, e.g., be followed by one or more retransmissions. Such retransmissions enhance robustness.

In the following, an embodiment is described, which assures that the control information can be realized as a one shot transmission or as a multiple transmission, possibly with a period of repetition in the regular pool and/or the exceptional pool.

In some embodiments, it may, e.g., be advantageous to select the sub-channel size sizeSubchannel as small as possible (currently >=5 RBs is supported, see [2]) to fit a minimum payload size per transmission/subchannel to avoid collision with other UEs as much as possible. The sub-channel size may, e.g., refer to the total number of PRBs that are used for data signal transmission and control signal transmission.

In some embodiments, it may, e.g., be advantageous for the burst transmission to use just 2 PRBs (in frequency domain), if only SCI control data is to be transmitted. However, the minimum allocated bandwidth, 1 sub-channel, consists of 5 PRBs. This means that 3 RBs remain unused: 5–2=3 PRBs according to the current specification). Those unused RBs would be located under the SCI transmission within the exceptional pool. The data PRBs may, e.g., be used to carry the repeated SCI, possibly scrambled to enhance robustness. The data PRBs may, e.g., be employed carry information to enhance decoding probability of second-level data transmission, e.g. (redundancy) bits/a redundancy version (RV) taken from the output of the channel-coding of the second-level transmission.

In some embodiments, alternatively or additionally, if emergency data is to be transmitted, the SCI may, e.g., be repeated in the control channel as well.

FIG. 8 illustrates an SPS repetition and SCI redundancy according to an embodiment. In particular, FIG. 8 illustrates an exceptional pool 811, and a (regular) resource pool 821. In the exceptional pool 811, a first message 851 being a critical communication notification is transmitted. The first message 851 announces the messages 861, 862, 863, 864 and 865. The announced critical messages 861, 862, 863, 864 and 865 are later on transmitted in the (regular) resource pool 821. Moreover, the first message 851 is repeated as message 853 to announce at least the remaining critical messages 863, 864 and 865. Resource pool 811 may, e.g., be defined as a shared resource pool or common configured grants or a commonly accessed bandwidth part or an exceptionally configured pool. Resource pool 821 may, e.g., be defined as a resource pool for communication or preconfigured communication resources or allocated bandwidth part or dynamically granted resources.

Three or more resources may, e.g., be filled with data in a first transmission. Multiple transmission of the PSSCH (Physical Sidelink Shared Channel) (with or without control) may, e.g., be repeated in a consecutive subframe with a repetition period T. Some of the transmitted PSSCH may, e.g., comprise data (as stated before, repeating the same emergency SCI) and/or some of the transmitted PSSCH may, e.g., be only emergency data PSSCH (see FIG. 8). Some of the transmitted PSSCH may, e.g., comprise different versions of the data, same data, or difference redundancy versions of the emergency data. Alternatively or additionally, either the originally transmitting UE-Vehicle or a relaying UE-Vehicle may, e.g., repeat the SCI only in the exceptional pool after a transmission period Tp3 (see FIG. 8).

FIG. 9 illustrates SPS data underneath the control information with repetition in the exceptional pool and the regular pool according to an embodiment. In particular, FIG. 9 illustrates an exceptional pool 911, and a regular resource pool 921. In the exceptional pool 911, a first message 951 being a critical communication notification is transmitted. The first message 951 announces the messages 961, 962, 963 and 964. The announced critical messages 961, 962, 963 and 964 are later on transmitted in the (regular) resource pool 921. Moreover, the first message 951 is repeated as message 953 to announce at least the remaining critical messages 963 and 964. Then, in the exceptional pool 911, another message 955 being a critical communication notification is transmitted, which announces message 965, wherein the announced message 965 is later on transmitted in the regular resource pool 921. Resource pool 911 may, e.g., be defined as a shared resource pool or common configured grants or a commonly accessed bandwidth part or an exceptionally configured pool. Resource pool 921 may, e.g., be defined as a resource pool for communication or preconfigured communication resources or allocated bandwidth part or dynamically granted resources.

According to embodiments, a data PSSCH may, e.g., also be transmitted in the exceptional pool with possible repetition period Tp. The SCI contains the resources in both regular pool and exceptional pool (see FIG. 9).

In the following, an embodiment for prioritizing transmission of emergency data when arriving within a time window before a regular data transmission is described.

Operation of Emergency control and existing data transmission in an emergency initiating vehicle according to embodiments may, e.g., be performed as follows.

If the vehicle already has a packet to transmit after a period ΔT1 and another emergency triggered announcement in the same vehicle arrives before a minimum possible channel access threshold ΔT2, the vehicle UE has to prioritize the transmission of the emergency signal and announcement (SCI over the exceptional resource pool).

The transmission of the emergency SCI (in the exceptional pool) and the associated emergency data PSSCH (with or without a copy of the SCI) may, e.g., be transmitted in the same subframe or in two consecutive subframes, as described before. The non-critical data transmission may, e.g., be be muted until the emergency situation is finished or deferred to a later subframe.

For same component carrier (CC) scheduling, the emergency data and non-emergency data can co-exist on a different (offsetted) subframes with a different transmission period, (if SPS transmission is configured).

FIG. 10 illustrates a same component carrier (CC) scheduling of emergency data and regular data according to an embodiment. In particular, FIG. 10 illustrates an exceptional pool 1011, and two resource pools 1021. In the exceptional pool 1011, a first message 1051 being a critical communication notification is transmitted. The first message 1051 announces the messages 1061, 1062, 1063 and 1064. The announced critical messages 1061, 1062, 1063 and 1064 are later on transmitted in the (regular) resource pool 1021. Moreover, the first message 1051 is repeated as message 1054 to announce at least the remaining critical messages 1063 and 1064.

In some embodiments, on receipt of the first message 1051, a user equipment stops transmitting other messages 1071, 1072 and 1073 in the regular pool 1021, so that the announced messages 1061, 1062, 1063 and 1064 will not be disturbed by the other messages 1071, 1072 and 1073.

In some embodiments, on receipt of the first message 1051, a user equipment will not transmit other messages 1071, 1072 and 1073 in the regular pool 1021 that were planned to be transmitted, so that the announced messages 1061, 1062, 1063 and 1064 will not be disturbed by the other messages 1071, 1072 and 1073 that were planned to be transmitted.

For different component carrier (CC) scheduling, the emergency data and non-emergency data can co-exist on different CCs on the same (or offsetted) subframe with a same transmission period or with a different transmission period (if SPS transmission is configured)

FIG. 11a illustrates a different component carrier (CC) scheduling of emergency data and regular data according to an embodiment. In particular, FIG. 11a illustrates an exceptional pool 1111, and two resource pools 1121, 1122. In the exceptional pool 1111, a first message 1151 being a critical communication notification is transmitted. The first message 1151 announces the messages 1161, 1162, 1163 and 1164 having high priority. The announced critical messages 1161, 1162, 1163 and 1164 are later on transmitted in the (regular) resource pool 1121. Moreover, the first message 1151 is repeated as message 1154 to announce at least the remaining critical messages 1163 and 1164. Other messages 1171, 1172, 1173, 1174 with low priority are transmitted in another regular resource pool 1122. The other messages 1171, 1172, 1173, 1174 with low priority may, e.g., be transmitted with a lower power than the announced critical messages 1161, 1162, 1163 and 1164 that have high priority.

The transmission of the emergency signal can be with a priority Pri1 and a transmission power Pow1, while the transmission of the normal data can be with a priority Pri2 and with a transmission power Pow2. Herein, Pri1>Pri2 and Pow1>=Pow2.

FIG. 11b illustrates a different component carrier scheduling of emergency data and regular data according to another embodiment. In the exceptional pool 1111, a first message 1156 being a critical communication notification is transmitted. The first message 1156 announces the message 1166 having high priority. The announced critical message 1166 is later on transmitted in the exceptional resource pool 1111. Moreover, in the exceptional pool 1111, another message 1157 being a critical communication notification is transmitted. Said another message 1157 announces the message 1167 having high priority. The announced critical message 1167 is later on transmitted in the exceptional resource pool 1111. Other messages 1176 and 1177 with low priority are transmitted in a regular resource pool 1121. The other messages 1176 and 1177 with low priority may, e.g., be transmitted with a lower power than the announced critical messages 1166 and 1167 that have high priority.

In the following, arranging the sidelink access frequency band transmission to convey the emergency message to a higher number of users according to an embodiment is described. In particular, an access on different frequency-bands with different transmission power and bandwidths is described.

To access the channel for emergency announcements, the vehicle-UE may, e.g., perform a sequence of accesses/trials to capture the channel for emergency transmissions to other vehicles. By this, the chance of reception of the emergency data and control shall be increased.

An emergency pool access procedure according to an embodiment may, e.g., be as follows:

In case of an emergency, if the vehicle is capable of connecting to multiple frequency bands, e.g., with or without multiple TX/RX chains:
  First, after an emergency packet arrives
    start with the dedicated bands (<6 GHz, e.g., ITS band around 5.9 GHz) and start emergency transmission procedure
  Else if band-transmission was not allowed or is not sufficient (after a short waiting period Ts)
    Switch to a lower frequency (<6 GHz) sidelink band on the configured or the pre-configured bit-maps and start emergency transmission procedure
  Else if band-transmission was not allowed or is not sufficient (after a short waiting period Ts)
    Switch to a higher frequency (mmWave) ITS band (63 GHz) and start emergency transmission procedure
  Else if band-transmission was not allowed or not sufficient (after a short waiting period Ts)
    Switch to a higher frequency (mmWave) licensed band on the configured or the pre-configured bit-maps and start emergency transmission procedure
  a Else end procedure
(mmWave=millimeter wave)
(ITS=Intelligent Transport Systems)

In the following, an embodiment for broadcasting a bit-map from a covered UEs to uncovered (autonomous) vehicles in the emergency control information is described. In particular, a pre-configured map may, e.g., be selectable to reduce the bit-map broadcasting number of bits in the sidelink control information (SCI).

Figure 12:
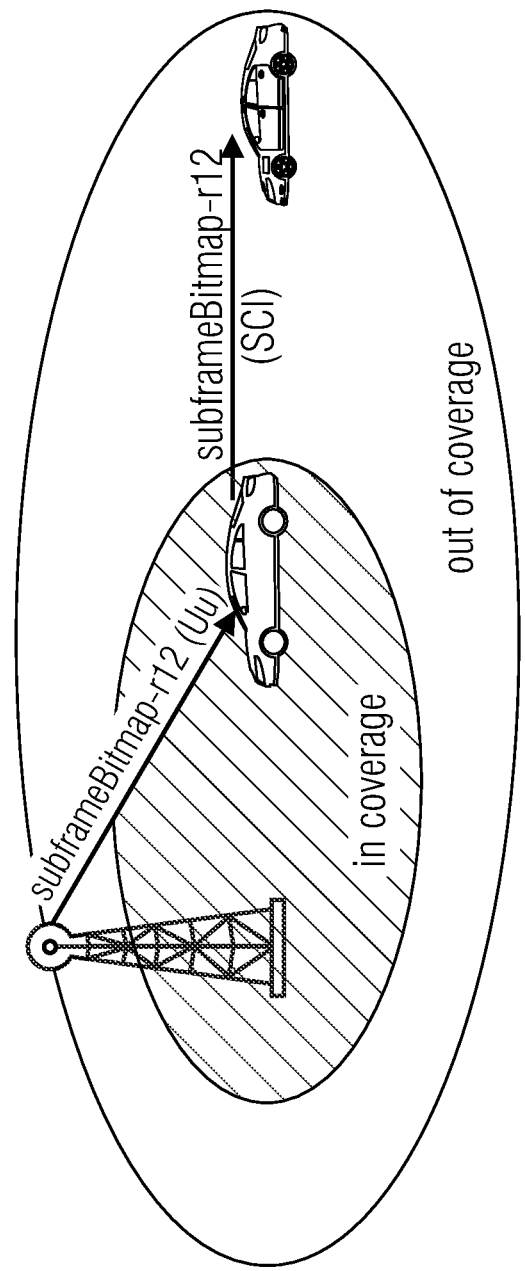
FIG. 12 illustrates a sidelink subframe configuration forwarding to out-of-coverage for emergency monitoring according to an embodiment.

FIG. 12 illustrates a sidelink subframe configuration forwarding to out-of-coverage for emergency monitoring according to an embodiment.

In the following, PSCCH Subframe and Resource Block Pools are considered.

If a vehicle processes an emergency request and it is in coverage, the bit map has to be transmitted to out of coverage. This procedure is conducted to force tuning of all out-of-coverage vehicles to monitor the emergency data. The bit-map may, e.g., be transmitted via the SCI emergency control information.

As in already existing systems, the bit maps are configured according to a periodical (pre-configured) pattern, known as bitmaps (subframeBitmap-r12 introduced in the field SL-FR-ResourceConfig in [5], Section 6.3.8). The length of the subframeBitmap-r12 is 40 bits. Those 40 bits may, e.g., be transmitted on Uu to convey an index T_RPT indicating the used bitmap sequence.

Similarly, the subframeBitmap-r12 has to be forwarded to the out of coverage vehicles to allow remote UEs to monitor emergency announcements and data transmission on the scheduled resources (see FIG. 12 for more details). To reduce data transmission on SCI (over exceptional pool), the subframeBitmap-r12 may, e.g., be remapped to a shorter emergency pool, e.g., by designing a smaller bitmap table or, e.g., by fixing the emergency announcement bit maps (for example, with shorter indexing number of bits).

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system.

Figure 5:
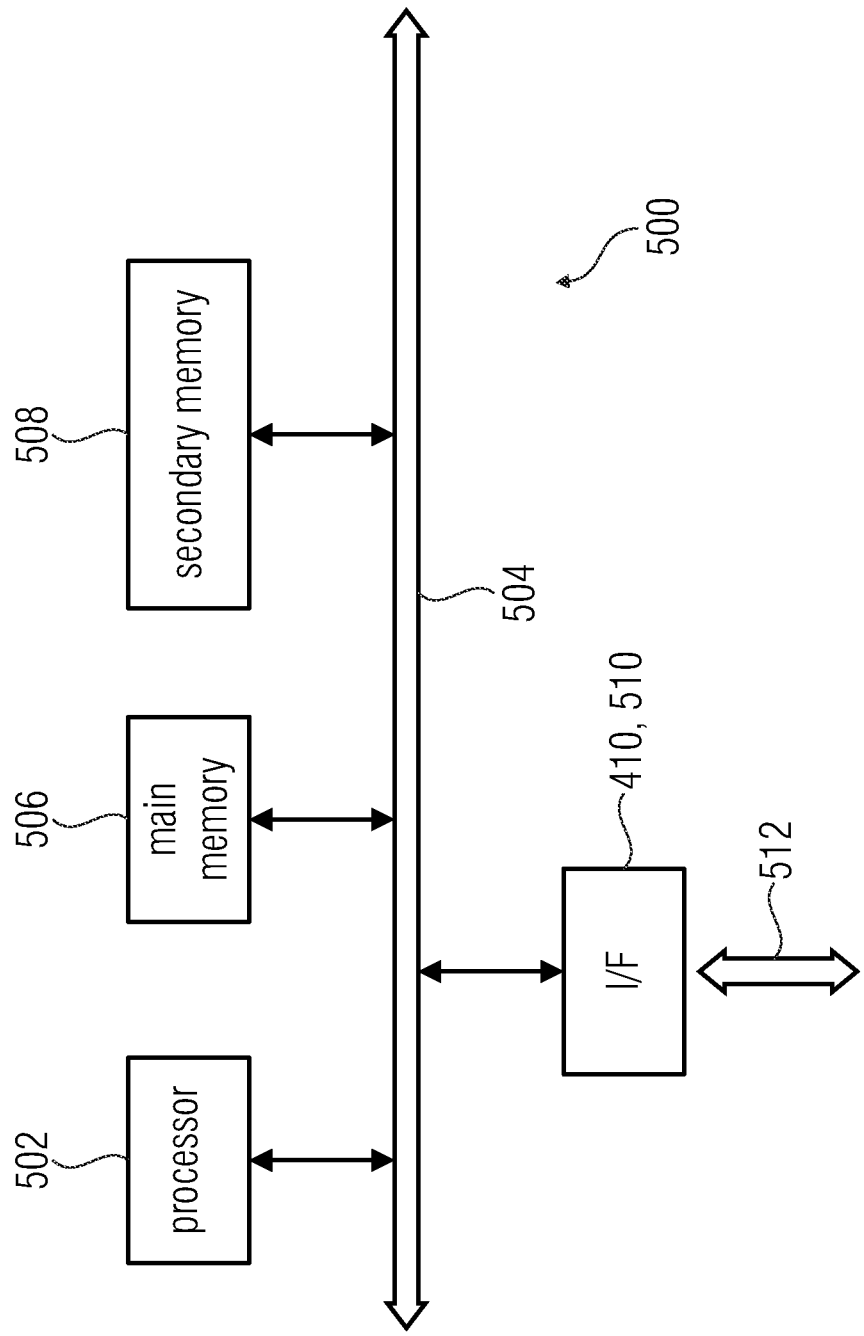
FIG. 5 illustrates an example of a computer system 500 according to an embodiment.

FIG. 5 illustrates an example of a computer system 500 according to an embodiment. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enable the computer system 500 to implement the present invention. In particular, the computer program, when executed, enable processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Abbreviations

| Abbreviation: | Meaning: |
| --- | --- |
| BS | Base Station |
| CBR | Channel Busy Ratio |
| D2D | Device-to-Device |
| EN | Emergency Notification (example for a critical communication notification) |
| eNB | Evolved Node B (base station) |
| FDM | Frequency Division Multiplexing |
| LTE | Long-Term Evolution |
| PC5 | Interface using the Sidelink Channel for D2D communication |
| PPPP | ProSe per packet priority |
| PPPR | ProSe per packet reliability |
| PRB | Physical Resource Block |
| ProSe | Proximity Services |
| RA | Resource Allocation |
| SCI | Sidelink Control Information |
| SL | sidelink |
| sTTI | Short Transmission Time Interval |
| TDM | Time Division Multiplexing |

-continued

| Abbreviation: | Meaning: |
| --- | --- |
| TDMA | Time Division Multiple Access |
| UE | User Entity (User Terminal) |
| URLLC | Ultra-Reliable Low-Latency Communication |
| V2V | Vehicle-to-vehicle |
| V2I | Vehicle-to-infrastructure |
| V2P | Vehicle-to-pedestrian |
| V2N | Vehicle-to-network |
| V2X | Vehicle-to-everything, e.g., V2V, V2I, V2P, V2N |

REFERENCES

[1] 3GPP TS 36.213 Evolved Universal Terrestrial Radio Access (E-UTRA); Physical layer procedures; V14.5.0
[2] TS 36.331 Evolved Universal Terrestrial Radio Access (E-UTRA)-Radio Resource Control (RRC); V14.
[3] 3GPP TS 36.211 Evolved Universal Terrestrial Radio Access (E-UTRA); Physical Channels and Modulation, v 14.3.0
[4] 3GPP TS 36.212 Evolved Universal Terrestrial Radio Access (E-UTRA); Multiplexing and channel coding, v 14.3.0
[5] 3GPP TS 36.321 Evolved Universal Terrestrial Radio Access (E-UTRA); Medium Access Control (MAC) protocol specification, v 14.3.0
[6] 2017P59629 EP: Emergency Notification (URLLC) Requesting Spontaneous Grant Free Transmission for V2X
[7] NGMN Alliance A White Paper "Small Cell Backhaul Requirements", Version 1.0, Jun. 4, 2012

The invention claimed is:

1. A user equipment for wireless communications, wherein the user equipment comprises:
    a transmitter circuit; and
    a receiver circuit;
    wherein a first resource pool is defined by a first resource pool configuration,
    wherein the first resource pool comprises a first plurality of resources
    wherein the first plurality of resources are provided for first transmissions,
    wherein the first transmissions have a first priority
    wherein a second resource pool is defined by a second resource pool configuration,
    wherein the second resource pool comprises a second plurality of resources,
    wherein the second plurality of resources are provided for second transmissions,
    wherein the second transmissions have a second priority,
    wherein the second priority is lower than the first priority,
    wherein the transmitter circuit is configured to transmit a first critical communication notification,
    wherein the first critical communication notification is a first message in the first resource pool,
    wherein the first critical communication notification has the first priority,
    wherein the first critical communication notification indicates that a second message is to be transmitted by the user equipment in the second resource pool,
    wherein the transmitter circuit is configured to transmit the second message in the second resource pool after transmitting the first critical communication notification or at a same time when transmitting the first critical communication notification, wherein the transmitter circuit is configured to transmit a fifth message in the second resource pool,
wherein the fifth message has the second priority,
wherein a third resource pool is defined by a third resource pool configuration,
wherein the third resource pool comprises a third plurality of resources,
wherein the third plurality of resources are provided for third transmissions,
wherein the third transmissions have the first priority,
wherein a fourth resource pool is defined by a fourth resource pool configuration,
wherein the fourth resource pool comprises a fourth plurality of resources,
wherein the fourth plurality of resources are provided for fourth transmissions,
wherein the fourth transmissions have the second priority,
wherein the transmitter is configured to transmit a sixth message in the fourth resource pool,
wherein the receiver circuit is configured to receive a third message,
wherein the third message is a second critical communication notification,
wherein the second critical communication notification is transmitted in the third resource pool,
wherein the second critical communication notification has the first priority,
wherein the second critical communication notification indicates that a fourth message is to be transmitted in the fourth resource pool,
wherein the second message is a critical communication message,
and
wherein the transmitter circuit is configured to refrain from transmitting the sixth message in the fourth resource pool in response to the receipt of the second critical communication notification by the receiver circuit.

2. The user equipment of claim 1,
wherein the first message comprises a pointer to the second message in the second resource pool, wherein the first message defines one or more frequency locations and a time location of the second message; or wherein the first message comprises the pointer to the second message in the second resource pool, wherein the first message defines the one or more frequency locations and the time location of the second message and a repetition periodicity; and/or
wherein the third message comprises a pointer to the fourth message in the fourth resource pool, wherein the third message defines one or more frequency locations and a time location of the fourth message; or wherein the third message comprises the pointer to the fourth message in the fourth resource pool, wherein the third message defines the one or more frequency locations and the time location of the fourth message and the repetition periodicity.

3. The user equipment of claim 1,
wherein the first resource pool comprises the first plurality of pre-configured resources for sidelink transmission, wherein the second resource pool comprises the second plurality of resources for sidelink transmission, wherein the third resource pool comprises the third plurality of resources for sidelink transmission, and wherein the fourth resource pool comprises the fourth plurality of resources for sidelink transmission.

4. The user equipment of claim 1,
wherein the transmitter circuit is configured to transmit the first critical communication notification in the first resource pool in a first time slot, and
wherein the transmitter circuit is configured to transmit the second message in the second resource pool in a second time slot after transmitting the first critical communication notification, wherein the second time slot is a delayed time slot with respect to the first time slot.

5. The user equipment of claim 1,
wherein the transmitter circuit is configured to transmit the second message in the second resource pool at a same time slot when the first critical communication notification is transmitted or at a subsequent time slot after the first critical communication notification is transmitted.

6. The user equipment of claim 1,
wherein the transmitter circuit is configured to transmit the first critical communication notification, wherein the first critical communication comprises an indication, wherein the indication indicates a resource among the second plurality of resources, wherein the indicated resource is indicated for transmission of the second message, wherein the transmitter circuit is configured to transmit the second message using the indicated resource, wherein the indication comprises a pointer to the indicated resource or comprises a subframe indication indicating a subframe or comprises a frequency indication indicating a frequency or comprises a component carrier indication indicating a component carrier.

7. The user equipment of claim 1,
wherein the transmitter circuit is configured to transmit the first critical communication notification in the first resource pool without sensing whether the first resource pool is occupied by another transmission.

8. The user equipment of claim 1,
wherein after transmitting the first critical communication notification for a first time, the transmitter circuit is configured to retransmit the first critical communication notification in the first resource pool one or more further times.

9. The user equipment of claim 1,
wherein the transmitter circuit is configured to send the third message to one or more other user equipments in response to the receipt of the second critical communication notification by the receiver circuit, wherein the third message indicates that the fourth message is to be transmitted in the fourth resource pool.

10. The user equipment of claim 9,
wherein the transmitter circuit is configured to transmit the first critical communication notification with a first transmission power, wherein the transmitter circuit is configured to transmit the second message with a second transmission power, wherein the first transmission power is greater than the second transmission power.

11. The user equipment of claim 1,
wherein at least one of the first critical communication notification and the second critical communication notification is sidelink control information, wherein the sidelink control information comprises one or more sidelink control information data elements, wherein the sidelink control information data elements comprise at least one of a component carrier index, a subframe index, an SPS period, an offset to the transmission, a subchannel size and an indication indicating whether frequency hopping is allowed.

12. The user equipment of claim 1,
wherein each of the first resource pool and the second resource pool and the third resource pool and the fourth resource pool is assigned to a plurality of component carriers,
wherein the first resource pool is assigned to a first component carrier of the plurality of component carriers, and
wherein the second resource pool is assigned to a second component carrier of the plurality of component carriers, wherein the second component carrier is different from the first component carrier.

13. The user equipment of claim 1,
wherein each of the first resource pool and the second resource pool and the third resource pool and the fourth resource pool is assigned to a plurality of component carriers,
wherein the first resource pool is assigned to a first component carrier of the plurality of component carriers, and
wherein the second resource pool is also assigned to the first component carrier.

14. The user equipment of claim 1,
wherein the user equipment is configured to be installed in a vehicle, and wherein, when the user equipment of the vehicle has an emergency request and when the vehicle is in coverage of a base station, the receiver circuit is configured to receive a subframe bitmap from the base station and the transmitter circuit of the user equipment is configured to transmit the subframe bitmap received from the base station to another vehicle that is out of coverage of the base station.

15. The user equipment of claim 1,
wherein the first resource pool is located on a same component carrier as the second resource pool, or
wherein the third resource pool is located on the same component carrier as the fourth resource pool.

16. The user equipment of claim 1,
wherein the first resource pool is not located on a same component carrier as the second resource pool, or
wherein the third resource pool is not located on the same component carrier as the fourth resource pool.

17. A system for wireless communications, comprising,
a first user equipment and a second user equipment,
wherein the first user equipment is a user equipment according to claim 1,
wherein the second user equipment is a user equipment according to claim 1,
wherein a transmitter circuit of the first user equipment is configured to transmit the second critical communication notification,
wherein a receiver circuit of the second user equipment is configured to receive the second critical communication notification from the transmitter circuit of the first user equipment,
wherein a transmitter circuit of the second user equipment is configured to refrain from transmitting anything in the second resource pool in response to the receipt of the second critical communication notification by the receiver circuit of the second user equipment,
wherein the transmitter circuit of the first user equipment is configured to transmit the second message in the second resource pool after transmitting the second critical communication notification or at a same time when transmitting the second critical communication notification.

18. A method for wireless communications, wherein a first resource pool is defined by a first resource pool configuration, wherein the first resource pool comprises a first plurality of resources, wherein the first plurality of resources are provided for first transmissions, wherein the first transmissions have a first priority, wherein a second resource pool is defined by a second resource pool configuration, wherein the second resource pool comprises a second plurality of resources, wherein the second plurality of resources are provided for second transmissions, wherein the second transmissions have a second priority, wherein the second priority is lower than the first priority, wherein a third resource pool is defined by a third resource pool configuration, wherein the third resource pool comprises a third plurality of resources, wherein the third plurality of resources are provided for third transmissions, wherein the third transmissions have the first priority, and wherein a fourth resource pool is defined by a fourth resource pool configuration, wherein the fourth resource pool comprises a fourth plurality of resources, wherein the fourth plurality of resources are provided for fourth transmissions, wherein the fourth transmissions have the second priority, wherein the method comprises:
transmitting a first message by a transmitter circuit of a user equipment in the first resource pool, wherein the first message comprises a first critical communication notification, wherein the first critical communication notification has the first priority, wherein the first critical communication notification indicates that a second message is to be transmitted by the user equipment in the second resource pool,
transmitting the second message by the transmitter circuit in the second resource pool after transmitting the first critical communication notification or at a same time when transmitting the first critical communication notification,
transmitting a fifth message in the second resource pool, wherein the fifth message has the second priority,
receiving a third message in the third resource pool by a receiver circuit, wherein the third message comprises a second critical communication notification, wherein the second critical communication notification indicates that a fourth message is to be transmitted in the fourth resource pool, and
refraining from transmitting anything in the fourth resource pool by the transmitter circuit in response to the receipt of the second critical communication notification by the receiver circuit.

19. A non-transitory digital storage medium having a computer program stored thereon to perform the method for wireless communications of claim 18 when said the program is executed by a processor.

20. The user equipment of claim 1, wherein the fourth resource pool configuration is different from the third resource pool configuration.

21. The user equipment of claim 1, wherein the fourth resource pool configuration and the third resource pool configuration are the same as each other.

22. The method of claim 18, wherein the fourth resource pool configuration is different from the third resource pool configuration.

23. The method of claim 18, wherein the fourth resource pool configuration and the third resource pool configuration are the same as each other.

24. The user equipment of claim 1, wherein the transmitter circuit is configured to transmit the second message in the second resource pool at a same time when transmitting the first critical communication notification.

25. The method of claim 18, comprising transmitting the second message by the transmitter circuit in the second resource pool at a same time when transmitting the first critical communication notification.

26. The method of claim 18, comprising:
transmitting the first critical communication notification with a first transmission power; and
transmitting the second message with a second transmission power, wherein the first transmission power is greater than the second transmission power.

27. The method of claim 18,
wherein each of the first resource pool and the second resource pool and the third resource pool and the fourth resource pool is assigned to a plurality of component carriers,
wherein the first resource pool is assigned to a first component carrier of the plurality of component carriers, and
wherein the second resource pool is assigned to a second component carrier of the plurality of component carriers, wherein the second component carrier is different from the first component carrier.

28. The method of claim 18,
wherein the first resource pool is not located on a same component carrier as the second resource pool, or
wherein the third resource pool is not located on the same component carrier as the fourth resource pool.

* * * * *